(12) United States Patent
Chefd'hotel et al.

(10) Patent No.: US 11,205,266 B2
(45) Date of Patent: Dec. 21, 2021

(54) SYSTEMS AND METHODS FOR DETECTION OF STRUCTURES AND/OR PATTERNS IN IMAGES

(71) Applicant: Ventana Medical Systems, Inc., Tucson, AZ (US)

(72) Inventors: Christophe Chefd'hotel, San Jose, CA (US); Ting Chen, Sunnyvale, CA (US)

(73) Assignee: VENTANA MEDICAL SYSTEMS, INC., Tucson, AZ (US)

( * ) Notice: Subject to any disclaimer, the term of this patent is extended or adjusted under 35 U.S.C. 154(b) by 29 days.

(21) Appl. No.: 16/879,106

(22) Filed: May 20, 2020

(65) Prior Publication Data

US 2020/0286233 A1 Sep. 10, 2020

Related U.S. Application Data

(60) Continuation of application No. 16/687,983, filed on Nov. 19, 2019, now Pat. No. 10,706,542, which is a
(Continued)

(51) Int. Cl.
*G06K 9/00* (2006.01)
*G06T 7/00* (2017.01)
(Continued)

(52) U.S. Cl.
CPC ........ *G06T 7/0012* (2013.01); *G06K 9/00127* (2013.01); *G06K 9/00147* (2013.01);
(Continued)

(58) Field of Classification Search
CPC ........ H04N 1/60; H04N 1/6033; H04N 1/603; H04N 9/735; H04N 1/6086; H04N 1/6058;
(Continued)

(56) References Cited

U.S. PATENT DOCUMENTS 5,742,700 A 4/1998 Yoon et al.
7,634,137 B2 12/2009 Simard et al.
(Continued)

OTHER PUBLICATIONS

Chen, "Deep Learning Based Automatic Immune Cell Detection for Immunohistochemistry Images," Sep. 2014, Sprinker (Year: 2014).*
(Continued)

*Primary Examiner* — Alex Kok S Liew
(74) *Attorney, Agent, or Firm* — Kilpatrick Townsend & Stockton LLP

(57) ABSTRACT

The subject disclosure presents systems and computer-implemented methods for automatic immune cell detection that is of assistance in clinical immune profile studies. The automatic immune cell detection method involves retrieving a plurality of image channels from a multi-channel image such as an RGB image or biologically meaningful unmixed image. A cell detector is trained to identify the immune cells by a convolutional neural network in one or multiple image channels. Further, the automatic immune cell detection algorithm involves utilizing a non-maximum suppression algorithm to obtain the immune cell coordinates from a probability map of immune cell presence possibility generated from the convolutional neural network classifier.

15 Claims, 13 Drawing Sheets
(6 of 13 Drawing Sheet(s) Filed in Color)

Related U.S. Application Data continuation of application No. 16/130,945, filed on Sep. 13, 2018, now Pat. No. 10,529,072, which is a division of application No. 15/360,447, filed on Nov. 23, 2016, now Pat. No. 10,109,052, which is a continuation of application No. PCT/EP2015/061226, filed on May 21, 2015.

(60) Provisional application No. 62/098,087, filed on Dec. 30, 2014, provisional application No. 62/002,633, filed on May 23, 2014.

(51) Int. Cl.
*G06N 3/04* (2006.01)
*G06N 3/08* (2006.01)

(52) U.S. Cl.
CPC ........... *G06N 3/0454* (2013.01); *G06N 3/084* (2013.01); *G06T 2207/10024* (2013.01); *G06T 2207/20081* (2013.01); *G06T 2207/20084* (2013.01); *G06T 2207/30024* (2013.01)

(58) Field of Classification Search
CPC ............... H04N 9/643; H04N 1/00307; H04N 1/32101; H04N 1/6011; H04N 1/6027; H04N 1/6052; H04N 1/6077; H04N 1/6088; H04N 1/628; H04N 2101/00; H04N 2201/3253; G06T 2207/10024; G06T 7/90; G06T 5/009; G06T 5/40; G06T 19/006; G06T 5/002; G06T 5/008; G06T 7/11; G06T 2207/20132; G06T 2207/30128; G06T 2207/30156; G06T 2207/30201; G06T 3/4038; G06T 5/003; G06T 7/0004

See application file for complete search history.

(56) References Cited

U.S. PATENT DOCUMENTS

| | | | |
|---|---|---|---|
| 9,266,109 | B2 | 2/2016 | Howell et al. |
| 10,109,052 | B2 | 10/2018 | Chefd'hotel et al. |
| 10,529,072 | B2 | 1/2020 | Chefd'hotel et al. |
| 10,706,542 | B2 | 7/2020 | Chefd'hotel et al. |
| 2005/0104961 | A1 | 5/2005 | Han et al. |
| 2007/0053573 | A1 | 3/2007 | Rabinovich |
| 2010/0004915 | A1 | 1/2010 | Miller et al. |
| 2010/0183217 | A1 | 7/2010 | Seung et al. |
| 2011/0249883 | A1 | 10/2011 | Can et al. |
| 2013/0121548 | A1 | 5/2013 | Kovalan et al. |

OTHER PUBLICATIONS

Amin, "Brain Tumor Classification Based on DWT Fusion of MRI Sequences Using Convolutional Neural Network,", Pattern Recognition Letters (IF 3.255), 2019.

Masci, "Steel Defect Classification with Max-Pooling Convolutional Neural Networks," Jul. 2012, IEEE.

Xie, "Automatic Segmentation of Dermoscopy Images Using Self-Generating Neural Networks Seeded by Genetic Algorithm," Aug. 2012, Pattern Recognition 46 (2013) 1012-1019, all pgs.

Ciresan, et. al.: "Mitosis Detection in Breast Cancer Histology Images with Deep Neural Networks", Sep. 22, 2013, Advances in Communication Networking: 20th Eunice/IFIP EG 6.2, 6.6 International Workshop, Renn Es, France.

International Preliminary Report on Patentability dated Nov. 29, 2016 in related application No. PCT/EP2015/061226, all pgs.

Malon, et. al., "Identifying Histological Elements with Convolutional Neural Networks", CSTST—Proceeding of the 5th International Conference, 2008, pp. 450-456.

Veta, et. al., 2013, "Detecting Mitotic Figures in Breast Cancer Histopathology Images", Proc of SPIE, vol. B676:867607-1-867607-7.

Wang, et. al., "Cascaded Ensemble of Convolutional Neural Networks and Handcrafted Features for Mitosis Detection", Proc of SPIE, 2014.

Malon, et. al.,:"Classification of Mitotic Figures With Convolutional Neural Networks and Seeded Blob Features", Journal of Pathology Informatics,vol. 4, No. 9, May 30, 2013 (May 30, 2013), pp. 1-5, XP055201886, ISSN: 2153-3539, DOI: 10.4103/2153-3539.112694.

\* cited by examiner

SYSTEMS AND METHODS FOR DETECTION OF STRUCTURES AND/OR PATTERNS IN IMAGES

RELATED APPLICATIONS

This patent application is a continuation application of U.S. patent application Ser. No. 16/687,983, filed Nov. 19, 2019, which is a continuation application of U.S. patent application Ser. No. 16/130,945, filed Sep. 13, 2018, which is a divisional application of U.S. patent application Ser. No. 15/360,447, filed Nov. 23, 2016, which is a continuation of International Patent Application No. PCT/EP2015/061226 filed May 21, 2015, which claims priority to and the benefit of U.S. Provisional Application No. 62/098,087, filed Dec. 30, 2014, and entitled "SYSTEMS AND METHODS FOR DEEP LEARNING FOR CELL DETECTION", and to U.S. Provisional Application No. 62/002,633, filed May 23, 2014, and entitled "DEEP LEARNING BASED AUTOMATIC CELL COUNTING SYSTEM AND METHOD." The contents of all the aforementioned applications are hereby incorporated by reference in their entirety into this disclosure.

BACKGROUND OF THE SUBJECT DISCLOSURE

Field of the Subject Disclosure

The present subject disclosure relates to image analysis. More particularly, the present subject disclosure relates to automatically identifying structures (e.g., cellular structures) or patterns (e.g., background or white space) in an image.

Background of the Subject Disclosure

In the analysis of biological specimens such as tissue sections, blood, cell cultures and the like, biological specimens are often stained with one or more combinations of stains or assays, and then the stained biological specimen is viewed or imaged for further analysis. Observing the assay enables a variety of processes, including diagnosis of disease, assessment of response to treatment, and development of new drugs to fight disease.

For example, upon applying a light source to the tissue, the assay can be assessed by an observer, typically through a microscope. Alternatively, an image may be generated of the biological specimen after and assay has been applied, and image data can be acquired from the assay for further processing. In such an acquisition, multiple channels of image data, for example RGB color channels, are derived, with each observed channel comprising a mixture of multiple signals. Processing of this image data can include methods of color separation, spectral unmixing, color deconvolution, etc. that are used to determine a concentration of specific stains from the observed channel or channels of image data. For image data processed by automated methods, depicted on a display, or for an assay viewed by an observer, a relation may be determined between a color of the tissue and a color of the stains, to determine a model of the biomarker distribution in the stained tissue. A local presence and amount of stain may indicate a presence and a concentration of the biomarkers queried in the tissue.

The publication 'Adaptive Spectral Unmixing for Histopathology Fluorescent Images' by Ting Chen et al, Ventana Medical Systems, Inc. provides an introduction and an overview as to various prior art techniques for spectral unmixing of multiplex slides of biological tissue samples, the entirety of which is herein incorporated by reference. Various other techniques for spectral unmixing of tissue images are known from WO 2012/152693 A1 and WO 2014/140219 A1.

Multiplex immunohistochemistry (IHC) staining is a technique for the detection of multiple biomarkers within a single tissue section and has become more popular due to its significant efficiencies and the rich diagnostic information it generates. IHC slide staining can be utilized to identify proteins in cells of a tissue section and hence is widely used in the study of different types of cells, such as cancerous cells and immune cells in biological tissue. For example IHC staining may be utilized in the diagnosis of abnormal cells such as the ones in cancerous tumors. Typically, the immunological data indicates the type, density, and location of the immune cells within tumor samples and this data is of particular interest to pathologists in determining a patient survival prediction. Thus, IHC staining may be used in research to understand the distribution and localization of the differentially expressed biomarkers of immune cells (such as T-cells or B-cells) in a cancerous tissue for an immune response study. For example, tumors often contain infiltrates of immune cells, which may prevent the development of tumors or favor the outgrowth of tumors. In this scenario, multiple stains are used to target different types of immune cells, and the population distribution of each type of immune cell is used in studying the clinical outcome of the patients.

Immune profile studies typically relate the immune response to the growth and recurrences of human tumors. However, a prerequisite of the immune profile study requires the human observer, utilizing a brightfield microscope, to manually locate and count the number of different immune cells within the selected tissue regions, for example, the lymph node regions which may contains hundreds to thousands of cells. This is an extremely tedious and time consuming process and the results may also subject to intra- and inter-individual variability. A tissue slide is typically stained by the IHC diagnostic assay with the cluster of differentiation (CD) protein markers identifying the immune cells and the nucleus marker Hematoxylin (HTX) marking the nuclei. The stained slide is then imaged using a CCD color camera mounted on a microscope or a scanner. The acquired RGB color image is hence a mixture of the immune cell membrane and the universal cell nuclear biomarker expressions.

Several techniques have been disclosed in the prior art to detect the cells. Most of the techniques are based on image processing that capture the symmetric information of the cell appearance features. Machine learning techniques have also been explored for cell detection, such as statistical model matching learned from structured support vector machine (SVM) to identify the cell-like regions. However, these techniques are limited to automatic nucleus detection rather than membrane detection. Since immune cell markers such as CD3 and CD8 for universal T-cells and cytotoxic T-cells respectively are membrane markers, the stain shows a ring appearance rather than the blob appearance of a nucleus. Although some machine learning based systems use scale invariant feature transform (SIFT) for maintaining sufficient contrast of cell boundaries, this method was developed for unstained cell images and it is non-trivial to extend it to detect immune cells in IHC stained images.

SUMMARY OF THE SUBJECT DISCLOSURE

The present invention provides an image processing method for automatic detection of biological structures in a multi-channel image obtained from a biological tissue sample being stained by multiple stains and a respective image processing system as claimed in the independent claims 1 and 7. Embodiments of the invention are given in the dependent claims and the further aspects of the invention in the further independent claims.

A 'biological tissue sample' as understood herein is any biological sample, such as a surgical specimen that is obtained from a human or animal body for anatomic pathology. The biological sample may be a prostrate tissue sample, a breast tissue sample, a colon tissue sample or a tissue sample obtained from another organ or body region.

A 'multi-channel image' as understood herein encompasses a digital image obtained from a biological tissue sample in which different biological structures, such as nuclei and tissue structures, are simultaneously stained with specific fluorescent dyes, each of which fluoresces in a different spectral band thus constituting one of the channels of the multi-channel image.

An 'unmixed image' as understood herein encompasses a grey-value or scalar image obtained for one channel of a multi-channel image. By unmixing a multi-channel image one unmixed image per channel is obtained.

An 'image patch' as understood herein encompasses a portion of an unmixed image, in particular a portion of the unmixed image that comprises a candidate location of interest.

A 'stack of image patches' as understood herein encompasses a set of image patches, where the stack size equals the number of channels, and where each image patch of the stack is obtained from one of the unmixed images. In particular, each image patch of the same stack covers the same area in the original multi-channel image.

A 'color channel' as understood herein is a channel of an image sensor. For example, the image sensor may have three color channels, such as red (R), green (G) and blue (B).

Embodiments of the invention are particularly advantageous as a convolutional neural network is employed for generating a probability map representing a probability for the presence of the biological features that has a structure which facilitates the training of the convolutional neural network (CNN), provides enhanced stability and reduces the computational burden and latency times experienced by the user. This is accomplished by connection mapping of the inputs of the CNN to feature maps of its first convolutional layer such that subsets of the channels that are representative of co-located biological features are mapped to a common feature map. By using the a priori biological knowledge as regards the co-location of stains a structure is thus enforced onto the CNN that has these advantageous effects. This is done by a step of configuring the CNN correspondingly.

In accordance with an embodiment of the invention the number of feature maps is below the number of channels of the multi-channel image. This is particularly advantageous for reducing the computational burden and increased stability of the CNN as well as to reduce the number of training images that are required for training the CNN.

In accordance with a further embodiment of the invention the image sensor that is used to acquire the multi-channel image has a number of color channels that is below the number of channels of the multi-channel image. The co-location data that describes the co-location data that describes the co-location of stains may be utilized for performing the unmixing, such as by using a group sparsity model as it is as such known from the prior art. This way the co-location data can be used both for performing the unmixing and for configuring the CNN.

The subject disclosure solves the above-identified problems by presenting systems and computer-implemented methods for automatic or semi-automatic detection of structures of interest within images, for example, cellular structures (e.g., cells. nuclei, cell edges, cell membrane), background (e.g., background patterns such as white or white-like space), background image components, and/or artifacts. In exemplary embodiments of the present invention, the present invention distinguishes cellular structures in an image from non-cellular structures or image components. The structures or components may be identified using a convolutional neural network that has been trained for this task. More particularly, the convolutional neural network may be trained to recognize specific cellular structures and features using training images and labels. The neural network outputs a probability that the detected structure does in fact represent a cell, membrane, background, etc. These probabilities may undergo a local maxima finding method such as non-maximum suppression in order to identify a particular pixel that will be used as the "location" of the object. A particular part of the cell, e.g., the approximate center of a nucleus, is illustratively used as the "location" of the object within the area under observation, i.e. an image patch.

Operations described herein include retrieving individual color channels from a multi-channel image and providing said multiple individual channels as input for a detector, for example, a cell detector. The cell detector may comprise a learning means that is trained using ground truths for cellular structures, such as cells, portions of cells, or other cell or image features identified by a trained operator, such as a pathologist. The trained cell detector may be used to identify cellular structures, such as immune cells, in the channels of the image that correspond to multiple types of cell markers or other target structures such as a nucleus. The learning means may include generating a convolutional neural network (CNN) by analyzing a plurality of training images with ground truths labeled thereon. Subsequent to the training, a test image or image under analysis may be divided into a plurality of patches, each patch containing one or multiple channels that are classified according to a CNN, and a probability map may be generated representing a presence of the immune cell or other target structure within the image. Further, a non-maximum suppression operation may be performed to obtain the coordinates of the target structure from the probability map.

In exemplary embodiments described herein, multiple types of cells, for example, immune cells may be detected from a multi-channel image, such as an original RGB image acquired from a brightfield imaging system, an unmixed fluorescent image, or an image in any other color space such as LAB. In alternate exemplary embodiments described herein, the detection can be applied to selected regions of the image instead of the whole image, and for example, enabled by detecting the foreground of the image, and only apply detection within the foreground region. To accelerate this cell detection process, a precomputed foreground mask can be used to enable processing of only regions of the image that are likely to contain immune cells in their foreground.

In one exemplary embodiment, the subject disclosure provides a computer-implemented method for automatic detection of structures in an image, the computer-implemented method stored on a computer-readable medium and comprising logical instructions that are executed by a processor to perform operations including training a learning module to obtain a probable location of cellular structures within one or multiple channels of an image, and applying the learning module to an input image or test image for analysis. The learning module may include a neural network classifier, such as a convolutional neural network classifier.

In another exemplary embodiment, the subject disclosure provides a system for automatic detection of structures in an image, the system including a processor and a memory coupled to the processor, the memory to store computer-readable instructions that, when executed by the processor, cause the processor to perform operations including training a classifier to obtain a probable location of cellular structures within one or multiple channels of an image, and applying the classifier to a test image.

In yet another exemplary embodiment, the subject disclosure provides a tangible non-transitory computer-readable medium to store computer-readable code that is executed by a processor to perform operations including extracting and classifying a patch extracted from a test image, convolving and subsampling regions of the patch until a fully connected layer is derived, and generating a probability map of one or more cellular structures within the input image or test image based on the fully connected layer.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE SUBJECT DISCLOSURE

Figure 1:
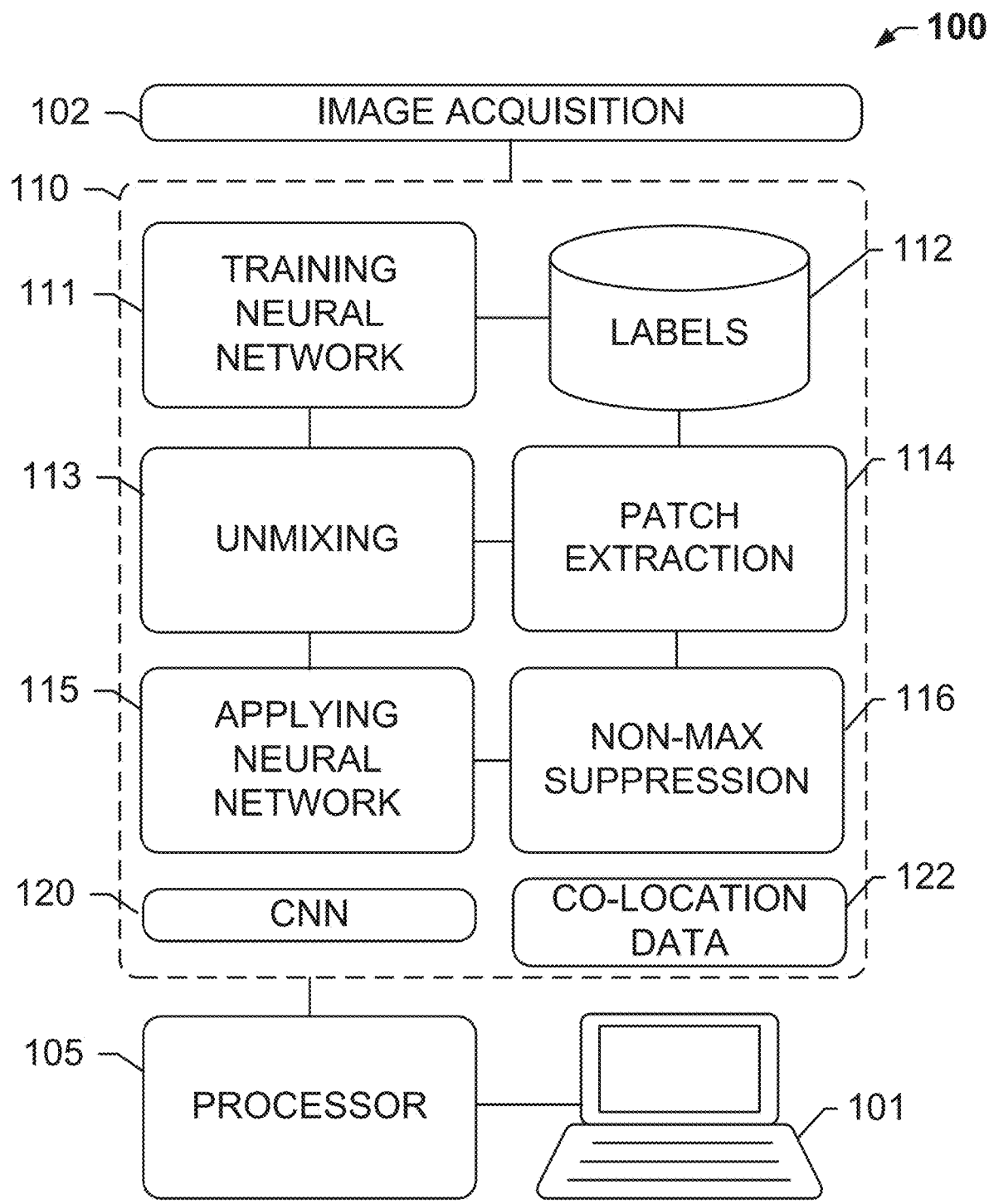
FIG. 1 shows a system for automatic detection of structures, according to an exemplary embodiment of the subject disclosure.

The subject disclosure solves the above-identified problems by presenting systems and computer-implemented methods for automatic detection of image structures, for example, cellular structures, including retrieving individual color channels from a multi-channel image and providing one or multiple individual channels or portions of image data from the one or more multiple individual channels as input for a cell detector that is trained using a convolutional neural network to identify the immune cells in one or multiple channels of the image that corresponds to an immune cell marker or other target structure such as a nucleus. The multi-channel image may be an RGB image obtained from a brightfield scanner, an image from another color space such as Lab, a multi-channel image from a multi-channel brightfield or darkfield scanner, a fluorescent image from a multi-spectral imaging system, a darkfield image, or any other multi-channel image. In some embodiments the image may be an image resulting from a color deconvolution or an unmixing process. The cell detector may be trained using a learning module such as a convolutional neural network (CNN) that is generated by analyzing a one or more training images. The training image or images may be the image of each individual channel from unmixing, for example, where each channel may correspond to a different biomarker that targets a different target structure or immune cell within the image, such as CD20, CD3, CD8, FP3, etc. The training image or images may also be multi-channel images, for example RGB images. During training, patches are formed around cell or image structures that are identified and labeled by a user on, for example, a user interface. The labeled patches generated during training, as described herein, may be used as inputs into the learning module. Based on the results of this process, training data may be generated representing a presence of the various types of structures that a user anticipates will be present in a test image or an image that is subjected to analysis, for example, immune cells or other target structures within the image. The training data includes labels for the training patches, such as identifications of nuclei, membranes, or background. For exemplary purposes, the disclosed embodiments are described with reference to immune cells. However, the operations disclosed herein are applicable to detection of any biological structure from a specimen, and differentiation of biological structures from background image components. Accordingly, the operations disclosed herein are applicable to whole cells, portions of cells, cell membranes, cell nuclei and/or background or other image components, such that, for example, cellular structures are differentiated from other structures or components of the image.

Subsequent to the training, a test image or image under analysis may be divided into a plurality of test patches as further described herein, with each patch and subject to a CNN for classification based on structures visible therein. In one exemplary embodiment, multiple types of immune cells and/or background may be detected from a multi-channel image, such as an original RGB image acquired from a brightfield imaging system, an unmixed image, or an image in any other color space such as LAB. For instance, a NxNxD patch around each pixel or every k pixels in the image may be formed based on pixels surrounding a central pixel in each channel, and the CNN may be executed on the extracted patch to classify the patches into classes of different cell types or backgrounds, with NxN being a size of the image patch in pixels or any other unit of size, and D being the number of channels in the image.

In another embodiment, the testing or detection can be applied to selected regions of the image instead of the whole image, enabled by detecting the foreground of the image, and only apply detection within the foreground region. For example, image patches may be extracted around the candidate locations that are determined by radial symmetry or ring detection operations that are applied to the image to determine candidate locations for cells or structures of interest or around the precomputed foreground regions by thresholding. Such operations are as such known from the prior art, cf. Parvin, B., et al.: Iterative voting for inference of structural saliency and characterization of subcellular events. IEEE Trans. Image Processing 16(3), 615-623 (2007). For example, cell nuclei may be detected using radial symmetry, and ring detection operations may detect cell membranes. To accelerate this cell detection process, a precomputed foreground mask can be used to enable processing of only regions of the image that are likely to contain target structures such as immune cells in their foreground. Thus, the process is made more efficient by extracting only portions of the image that correspond to the candidate locations.

The presence of structures may be represented as a probability map, with each probability map corresponding to one type of immune cell or other target structure. Further, a non-maximum suppression operation may be executed to obtain the immune cell coordinates from the probability map. In some embodiments, the image channels need not be unmixed, since multiple channels may be processed simultaneously. However, in another embodiment of the subject disclosure, the input can also be a single channel image, for example one that has resulted from unmixing a multiplex or multi-channel image.

FIG. 1 shows a system 100 for automatic detection of structures, according to an exemplary embodiment of the subject disclosure. System 100 comprises a memory 110, which stores a plurality of processing modules or logical instructions that are executed by processor 105 coupled to computer 101. Besides processor 105 and memory 110, computer 101 also includes user input and output devices such as a keyboard, mouse, stylus, and a display/touchscreen. As will be explained in the following discussion, processor 105 executes logical instructions stored on memory 110, performing training and analysis of a CNN module 120 and other operations resulting in an output of quantitative/graphical results to a user operating computer 101.

Image acquisition 102 may provide an image or image data from a scanned slide, for example, an IHC slide, as well as information about a target tissue type or object, as well as an identification of a staining and/or imaging platform. For instance, the sample may need to be stained by means of application of a staining assay containing one or more different stains, for example, chromogenic stains for brightfield imaging or fluorophores for fluorescence imaging. Staining assays can use chromogenic stains for brightfield imaging, organic fluorophores, quantum dots, or organic fluorophores together with quantum dots for fluorescence imaging, or any other combination of stains and viewing or imaging devices. Moreover, a typical sample is processed in an automated staining/assay platform that applies a staining assay to the sample, resulting in a stained sample. There are a variety of commercial products on the market suitable for use as the staining/assay platform, one example being the Discovery™ product of the assignee Ventana Medical Systems, Inc. Stained tissue may be supplied to an imaging system, for example on a microscope or a whole-slide scanner having a microscope and/or imaging components. Additional information provided by image acquisition 102 may include any information related to the staining platform, including a concentration of chemicals or substances used in staining, a reaction times for chemicals or substances applied to the tissue in staining, and/or pre-analytic conditions of the tissue, such as a tissue age, a fixation method, a duration, how the sample was embedded, cut, etc.

The color channels of a multi-channel image imaged by image acquisition 102 may be received by memory 110, and various modules executed to perform the operations described herein. For instance, a training neural network module 111 provides a means to identify and label objects of interest of an image, such cell locations in a foreground, and a background of the image, and establishing these as the ground truths in labels database 112. Training neural network module 111 may provide, for example, a user interface enabling a trained operator such as a pathologist to identify and label the cells, cellular structures, or other image structures, which have been located within the training images, to establish ground truths for such structures of interest. Such ground truths for the corresponding structures are used to train a classifier to identify similar structures in a test image or an image subject to analysis. Patch extraction module 114 may be invoked to extract patches around each cellular structure or image structure, corresponding to a location of one or more pixels, identified by the pathologist. For example, a plurality of patches of a specified size may be extracted around a range of pixels based on the pathologist's input, from a training image, and used along with the labels corresponding to "nucleus", "membrane", "background", etc., in order to train a neural network.

A convolutional neural network (CNN) may be trained using the ground truths. A CNN is basically a neural network with the sequence of alternating convolutional layers and sub-sampling layers, followed by the fully connected layers, which can be trained by back-propagation algorithm, as further described with respect to FIG. 5. The advantage is using such a neural network include automatically learning the feature descriptors which are invariant to small translation and distortion from the training image patches. The CNN may be trained with the training data that includes patches of regions of the training image comprising the locations of cells, membranes, etc., identified by the pathologist, and their corresponding labels. To enable this, a patch extraction module 114 may be executed to extract relevant patches from each image channel, as further described with reference to FIGS. 3A-C. Further, the image and/or channels of an RGB or fluorescence image of a biological specimen, for example, a tissue sample, may be unmixed by unmixing module 113 prior to training or processing. The unmixing may provide different color channels corresponding to the different cell structures, such as nucleus and membrane.

Subsequent to the training, a test image or image under analysis may be divided into a plurality of patches using patch extraction module 114, and each patch may be processed and classified by applying neural network module 115. Applying neural network module 115 may use the trained neural network, such as a CNN trained as described herein, to classify the image patches from the test image. In this case, patch extraction module 114 extracts a plurality of patches from the image. The patches may be extracted by either doing a pixel-wise extraction e.g. based on random selection of pixels as described above. For example, a patch is extracted for each of the pixels or some selection of pixels, such as every other pixel. In an alternate embodiment, patches may be extracted by first detecting cell locations of the foreground and background.

In one exemplary embodiment, a NxNxD patch around each pixel or every k pixels, corresponding to the location of an image structure and/or image pattern that has been labeled, in the image may be extracted, and the applying neural network module 115 may be executed to classify the patches into classes of different cell types or backgrounds, with N×N being a size of the image patch in pixels or any other unit of size, and D being the number of channels in the image. The classifications may include whether or not the patch contains a structure of interest such as a T-cell, or a nucleus, or simply contains background data.

In an alternate embodiment, patch extraction module 114 extracts image patches around candidate locations, for example, cellular structures such as nuclei that are determined by radial symmetry or membrane that is detected by ring detection operations that are applied to the image to determine candidate locations for cells or structures of interest, such as nuclei. The patches may be used as inputs into the applying neural network module 115, which outputs as its results a probability map representing a presence of the immune cell or other target structure within the image. Further, a non-maximum suppression module 116 may be executed to obtain the immune cell coordinates from the probability map. For example, non-maximum suppression module 117 is used to find a center of the cell, indicating a reliable coordinate for the location of the cell within the resulting map. For example, the non-maximum suppression module 117 will set all pixels in the current neighborhood window that are lower than the maximum value in that window to zero. Other methods besides non-maximum suppression for finding the local maxima may be apparent to those having ordinary skill in the art in light of this disclosure.

Unmixing

The unmixing module 113 may include a sparse unmixing algorithm such as that described in commonly-assigned and co-pending U.S. Patent Application 61/943,265 and PCT/EP2015/053745, Group Sparsity Model for Image Unmixing, the contents of which are hereby incorporated herein by reference in their entirety. Relevant sections of the cited document describe systems and computer-implemented methods for unmixing multiplex IHC images having a number of stain contributions greater than a number of color channels, such as an RGB brightfield image, by obtaining reference colors from the training images, modeling a RGB image unmixing problem using a group sparsity framework, in which the fractions of stain contributions from colocalized markers are modeled within a same group and fractions of stain contributions from non-colocalized markers are modeled in different groups, providing co-localization information of the markers to the group sparsity model, solving this group sparsity model using an algorithm such as a Group Lasso, yielding a least squares solution within each group which corresponds to the unmixing of the colocalized markers, and yielding a sparse solution among the groups that correspond to the unmixing of non-colocalized markers. Reduction of the model to sparse unmixing without colocalization constraint is enabled by setting only one member in each group, and generating sparse unmixing results for less than or equal to three markers, in contrast to typical methods without sparse regularization. A computer-implemented method for unmixing an image may comprise generating a group sparsity model wherein a fraction of a stain contribution from colocalized markers is assigned within a single group and a fraction of a stain contribution from non-colocalized markers is assigned within separate groups, and solving the group sparsity model using an unmixing algorithm to yield a least squares solution within each group. A system for unmixing an image may comprise a processor and a memory to store computer-readable instructions that cause the processor to perform operations including generating a group sparsity framework using known co-location information of a plurality of biomarkers within an image of a tissue section, wherein a fraction of each stain contribution is assigned to a different group based on the known co-location information, and solving the group sparsity model using an unmixing algorithm to yield a least squares solution for each group. Finally, a tangible non-transitory computer-readable medium may store computer-readable code that is executed by a processor to perform operations including modeling an RGB image unmixing problem using a group sparsity framework, in which fractions of stain contributions from a plurality of colocalized markers are modeled within a same group and fractions of stain contributions from a plurality of non-colocalized markers are modeled in different groups, providing co-localization information of the plurality of colocalized markers to the modeled group sparsity framework, solving the modeled framework using a group lasso to yield a least squares solution within each group, wherein the least squares solution corresponds to the unmixing of the colocalized markers, and yielding a sparse solution among the groups that corresponds to the unmixing of the non-colocalized markers. Other methods for unmixing may be apparent to those having ordinary skill in the art in light of this disclosure.

As described above, the modules include logic that is executed by processor 105. "Logic", as used herein and throughout this disclosure, refers to any information having the form of instruction signals and/or data that may be applied to affect the operation of a processor. Software is one example of such logic. Examples of processors are computer processors (processing units), microprocessors, digital signal processors, controllers and microcontrollers, etc. Logic may be formed from signals stored on a computer-readable medium such as memory 110 that, in an exemplary embodiment, may be a random access memory (RAM), read-only memories (ROM), erasable/electrically erasable programmable read-only memories (EPROMS/EEPROMS), flash memories, etc. Logic may also comprise digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network. Moreover, the modules need not be executed in any specific order. For instance, classification module 118 may be invoked during operation of training module 111, as well as during operation of CNN module 116. Each module may call another module when needed to be executed.

Training

Figure 2A:
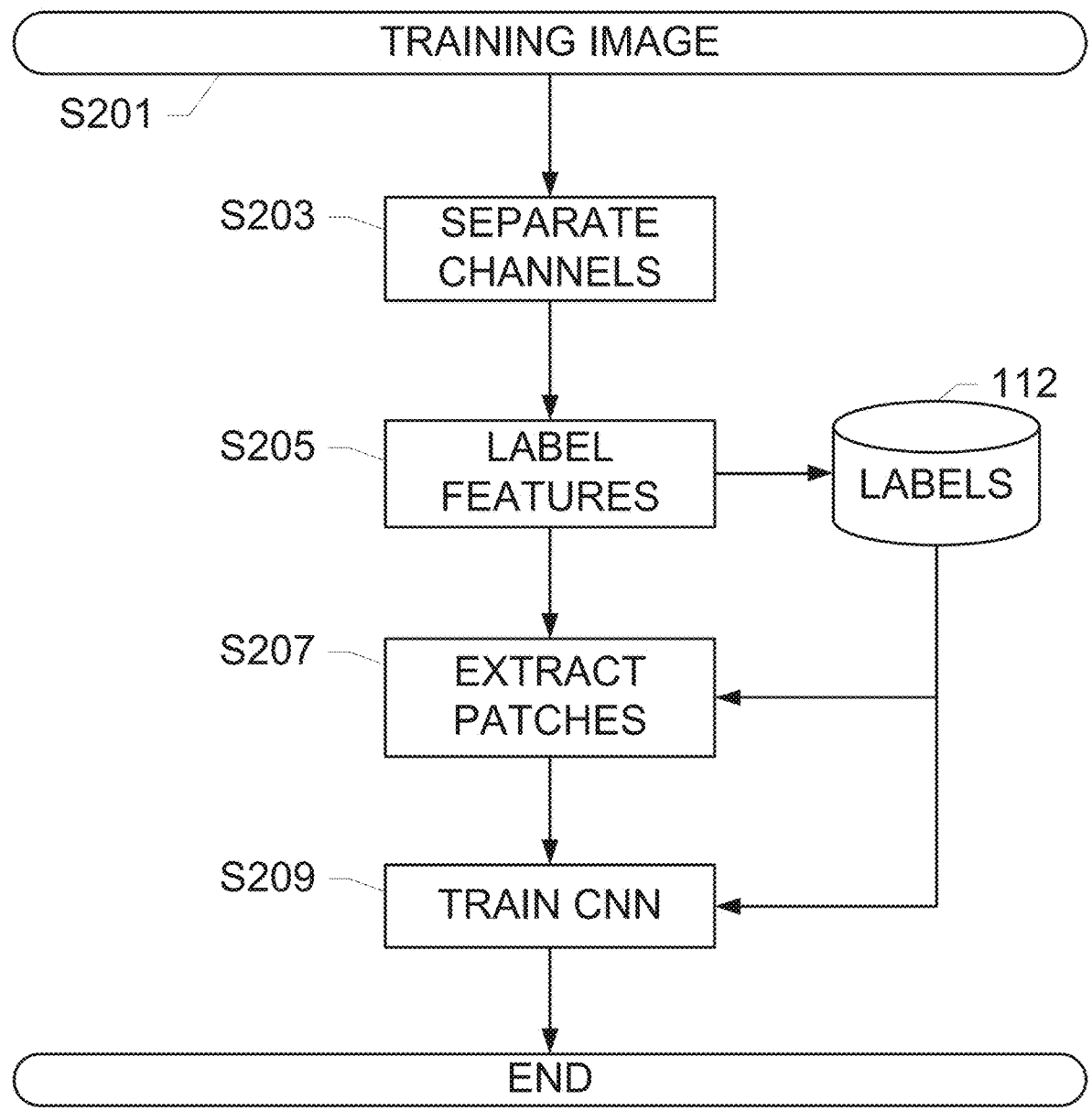
FIG. 2A-2B show a method for training an automatic structure detection system, according to an exemplary embodiment of the subject disclosure.
Figure 2B:
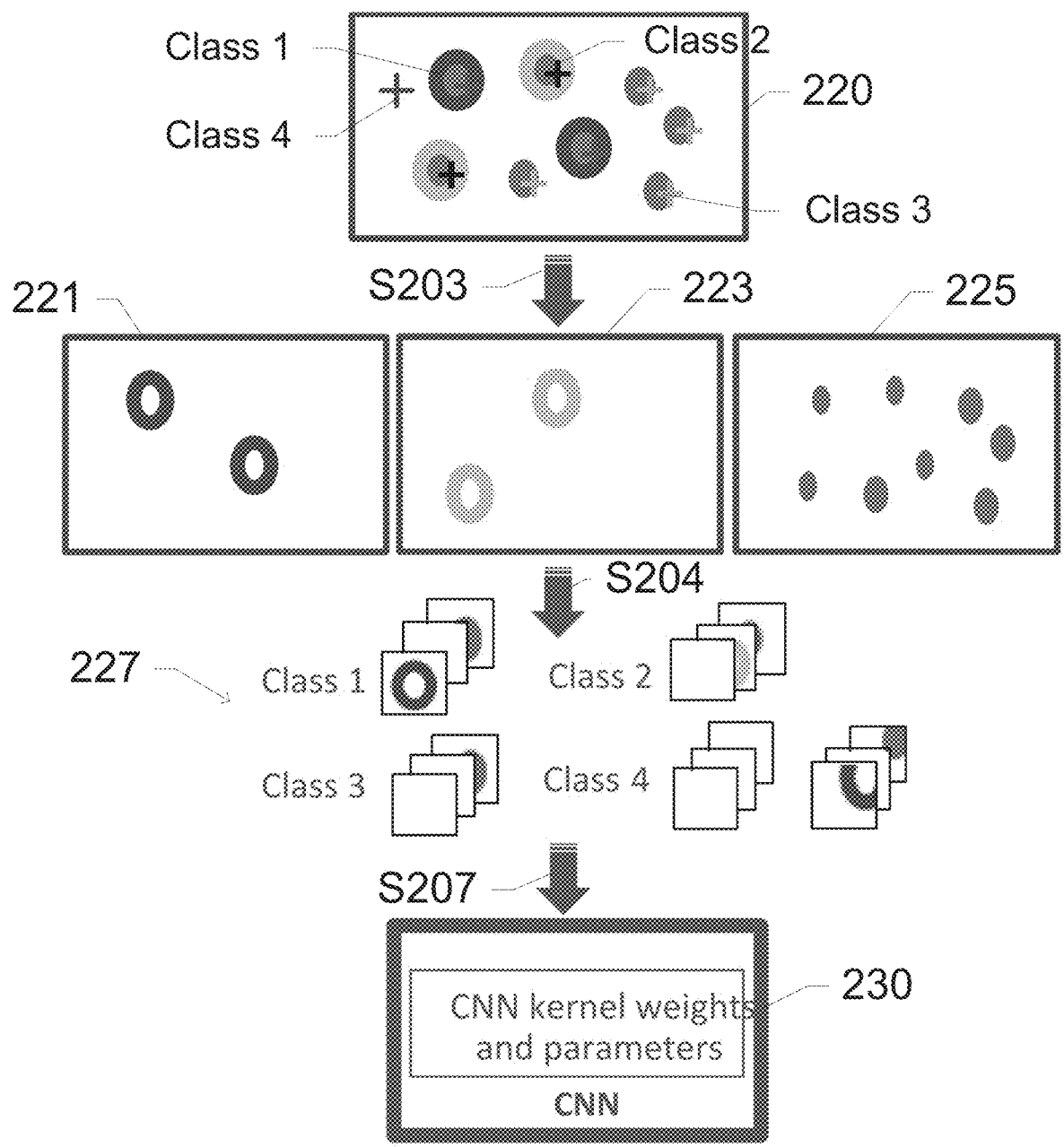

FIGS. 2A and 2B respectively show a method and an example for training an automatic structure detection system, according to an exemplary embodiment of the subject disclosure. The training process generates parameters of a neural network, such as a number of layers, kernels within each layer, etc., as further described herein. This method may use components described with reference to system 100, or other components that perform similar functions. With reference to FIG. 2A, for example, an image acquisition system may provide image data from a scanned IHC slide that results in a training image (S201). Along with image data may also be provided information about a target tissue type or object and identification of a staining and/or imaging platform. For instance, the sample may need to be stained by means of application of a staining assay containing one or more different biomarkers associated with chromogenic stains for brightfield imaging or fluorophores for fluorescence imaging.

The color channels of a multi-channel image may be separated (S203) for analysis. For instance, color channels containing known information about immune cells may be selected to train the system. For a multiplex image, an unmixing operation may be performed to separate the channels. Other examples of the multi-channel image may be an RGB image obtained from a brightfield scanner, an image from another color space such as Lab, a multi-channel image from a multi-channel brightfield scanner, a fluorescent image from a multi-spectral imaging system, or any other multi-channel image. In some embodiments the image may be an image resulting from a color deconvolution or an unmixing process. The training image may be one of a plurality of training samples.

In an exemplary embodiment of the subject disclosure, a user, for example a pathologist, identifies an image component or biological structure, for example a cellular structure such as a cell or nuclei that the user anticipates will be present in a test image or an image subject to analysis by a trained convolutional neural network. After the user selects an image component, and labels it, for example as a first type of immune cell, patches are generated around the first type of immune cell and the convolutional neural network is applied to the generated patches to generate feature maps for the patches implicitly. As the patches have been specifically identified to correspond to a particular biological structure, the feature maps generated by the convolutional neural network are specific to the biological structure and thus include image feature from the implicit feature maps or biologically-relevant information from the configuration of the convolutional neural network. This process may be performed for multiple image components, for example a second type of immune cell, a first type of cell nucleus, and/or a second type of cell nucleus. As a result there is improved classification of image components, for example, when a test image or an image or image data subject to analysis input into an apply neural network module, the image components are identified according to specific feature information associated with that image component. For example, different types of immune cells in the test image will be labeled accordingly, as the first type of immune cell or the second type of immune cell, based on the biological feature or biologically-relevant information that is part of the feature maps for those respective types of cells that was generated during the training steps.

Labeling features (S205) receives input from a trained operator, such as a pathologist, to identify and establish ground truths. For example, a pathologist may click on image structures (e.g., cellular structure) or specific pixel or pixels on a training image to identify a cell, and add labels to label database 112. The location of the image structure, for example, the coordinates of the centers or centroids of the image structure or selected pixel or pixels, are recorded as the ground truth of the structure (e.g., cellular structure) or selected pixels. The labels may be provided as input into a patch extraction operation (S207). Multiple channels can be simultaneously processed by this method, for example by using parallel processing techniques. Example labels include identifiers of a cell centroid or center of a nucleus, a cell membrane, a background, or any other cellular structure.

A plurality of patches may be extracted (S207) from the multiple channels. The patches may be extracted from the coordinates of cell centroids, background, membrane, etc. that are input by the pathologist in label features step S205. The patches extracted from each location may be subject to additional processing as further described with respect to FIGS. 3B and 3C. The resulting set of training patches, along with their corresponding labels, are established as ground truths, and used to train a CNN (S209). For example, T-cells may be labeled as a ground truth by a pathologist, and classified in a first class that contains all the patches centered at the pixels in the k-pixel (e.g. k=5) neighborhood of the ground truth. Another class may be labeled as a non-T-cell class, which contains the patches centered at pixels sampled from the boundary of the T-cells and the background. Another class may include non-immune-cell nuclei. In some embodiments, a multiplexed image may be unmixed to multiple channels corresponding to different stains.

With reference to FIG. 2B, for example, a training image 220 of a scanned IHC slide may depict different types of immune cells, each having its own nuclei, as well as one or more non-immune cell nuclei. The individual structures are labeled with class 1-class 4 and may be annotated by a pathologist in order to provide reliable data, or may be based on known and/or clearly delineated structures in the training image 220. For instance, the pathologist's annotations may be provided using a labeling interface and used to extract relevant image patches. Prior to patch extraction (S204), the color channels may be separated (S203) either simply by retrieving the individual channels or by unmixing, for instance in the case of a multiplex image. Multiple channels extracted may include a first type of immune cell marker channel 221, a second type of immune cell marker channel 223, and a nucleus marker channel 225. During testing operations, this biologically-relevant unmixing is used to bolster the immune cell classification results.

With respect to this training embodiment, a plurality of patches may be extracted (S204) from each channel. The patches may be extracted by manual annotation of the cell locations of the foreground and background, and establishing these as ground truths storing the image patches of the cells and backgrounds in a labels database. The patches may be classified, for example as separate classes of patches 227, such as Class 1 for a first type of immune cell, class 2 for a second type of immune cell, class 3 for a non-immune cell nucleus, and class 4 for a background or cell boundary, based on the annotations provided using the labeling interface described above. For example, T-cells may be labeled by a pathologist or trained operator as a ground truth, and classified in a first class 1 that contains all the patches centered at the pixels in the k-pixel (e.g. k=5) neighborhood of the ground truth. Another class 2 may be labeled as a non-T-cell class, which contains the patches centered at pixels sampled from the boundary of the T-cells and the background. Another class 3 may include non-immune-cell nuclei. These patch classifications are merely exemplary, and other types of classifications may be useful depending on the types of cells in the image, and the intended diagnosis. The CNN 230 is trained (S207) with the training image patches that are appropriately classified and labeled. The trained CNN 230 may subsequently be used to process multiple input channels from a test specimen.

Patch Extraction

Figure 3A:
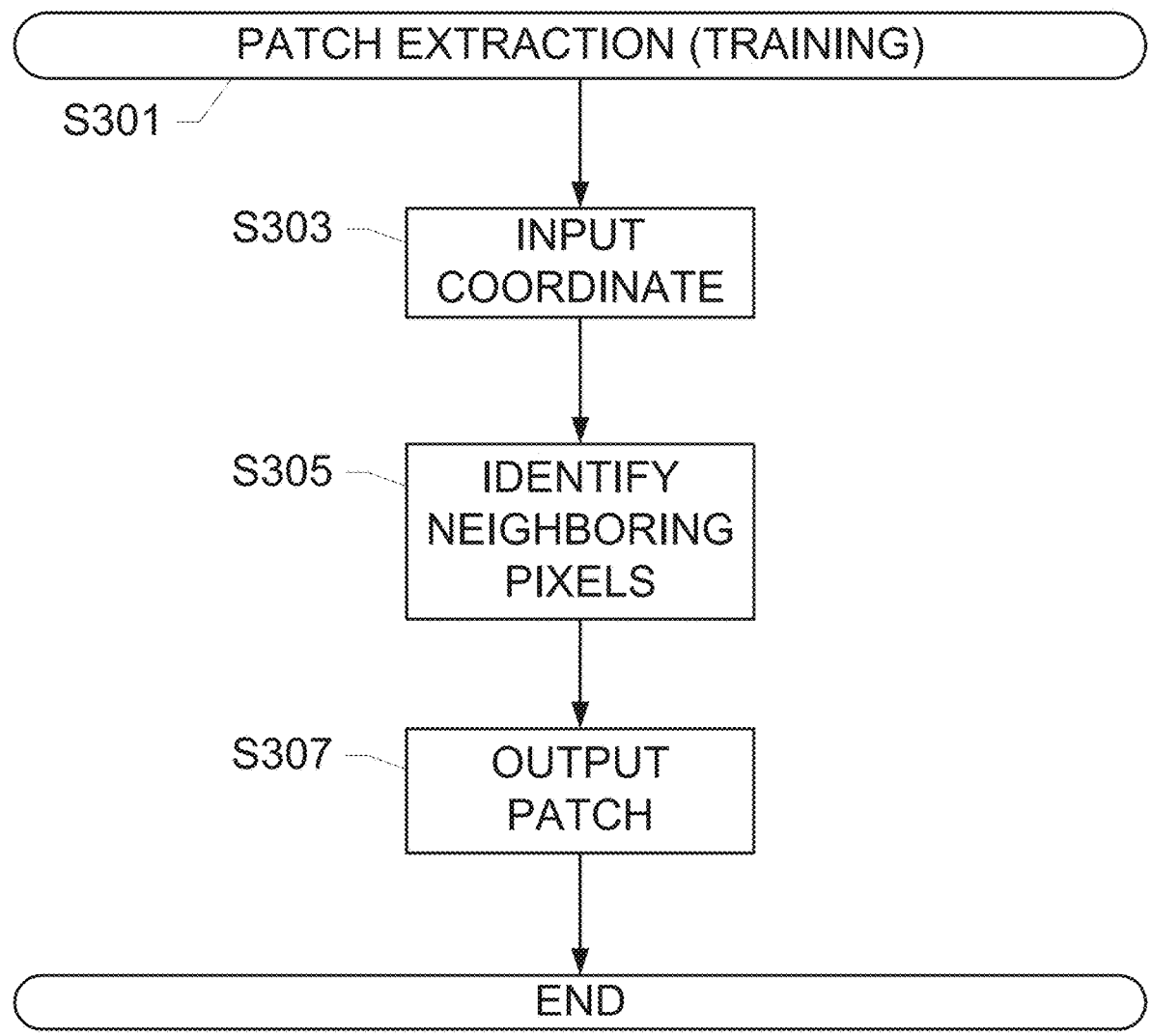
FIGS. 3A-3F show a method for patch extraction and examples of different types of patches that are utilized for training the classifier, according to exemplary embodiments of the subject disclosure.

As described above, image patches are extracted around identified image structures, for example, centroids of cells or nuclei and processed using a CNN. FIG. 3A depicts an exemplary method for patch extraction during training. The patch extraction operation (S301) begins with an input of a coordinate, such as a coordinate x,y. During training, as described above, the coordinate of the cellular structure (such as a centroid or membrane) may be input by a trained operator, along with a label corresponding to the cellular structure identified by the operator. Pixels neighboring the input pixel may be identified (S305) for the purposes of extracting patches that are close to the identified pixel. In other words, a patch is extracted for each input pixel, and a corresponding patch is extracted for each pixel around a proximity of the input pixel. This is to ensure that various errors such as the rotational and translational errors in the training process are accounted for, and these steps are further described with respect to FIGS. 3B and 3C. The output (S307) comprises a neighborhood of pixels around the coordinate x,y, and may comprise an image of a size a,b centered at x,y. The size a,b may vary, and may correspond to an average size of a cell, depending on the image magnification/zoom. Generally, an output patch outputs a whole cell. For example, a rectangular patch with a=b=N may be utilized.

For example, an input image may comprise an RGB image I, wherein individual color channels of the image are used to represent, for instance, immune cell marker and nucleus marker channels, denoted, for example, as $I_{dab}$ and $I_{htx}$, respectively. $I_{dab}$ is then used as a training image input into a CNN. For example, the immune cell detection problem may be formulated as classifying each pixel of $I_{dab}$ into two classes, positive for the centroids of the immune cells and negative for the rest. Then, let P be the training data and Y be the set of labels, where $(p_n, y_n)$ are drawn randomly from P×Y based on some unknown distribution. P represents a set of patch images centered at each pixel of $I_{dab}$ and Y is a binary set containing two labels $\{+1,-1\}$. The coordinates of the cell centroids are recorded for the ground truth immune cell (i.e., locations of cells that have been verified as immune cells, and manually labeled by the pathologist). The positive class of training data consists of k by k-pixel image patches centered at the pixels in the d-pixel neighborhood of the recorded coordinates.

Figures 3B, 3C:
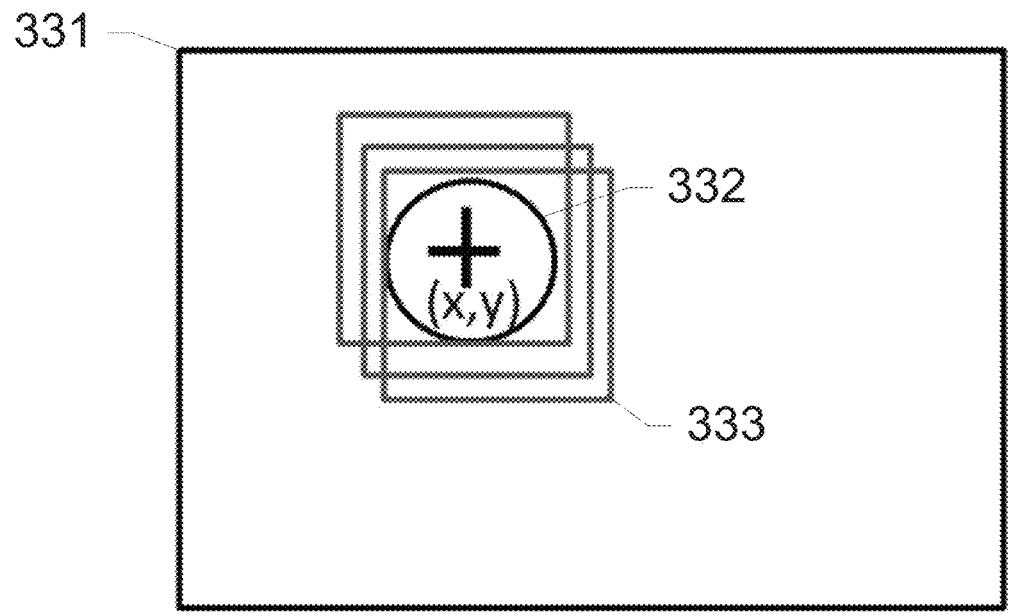

FIG. 3B depicts an input image 331 with a plurality of patches 333 centered around a d-pixel neighborhood of coordinates x,y of cell 332. Coordinates x,y may have been specified by a trained operator or pathologist, along with a label identifying the type of pixel, i.e. "cell centroid", "cell membrane", "background", etc. The d-pixel neighborhood takes all the pixels within a region x-d,y-d to x+d, y+d, i.e. the range of all the coordinates corresponding to the x,y. For each of these several pixels within the d-pixel neighborhood of x,y, a patch is created, enabling more than one patch to be extracted given a single central coordinate x,y. This process is performed only for the training phase, since the non-immune cell class contains all the image patches centered at the pixels sampled from the boundaries of the immune cells and the background. FIG. 3C depicts a grid of pixel values corresponding to patches 333 in FIG. 3B. The retrieved patches may be rotated by a specified number of degrees to generate more rotated versions of the data, and may be flipped from left to right, and up to down. to account for variations during testing. In other words, the training patches are subject to various transformations during training, to enable robust detection of similar regions in test images that are slightly different.

Figure 3D:
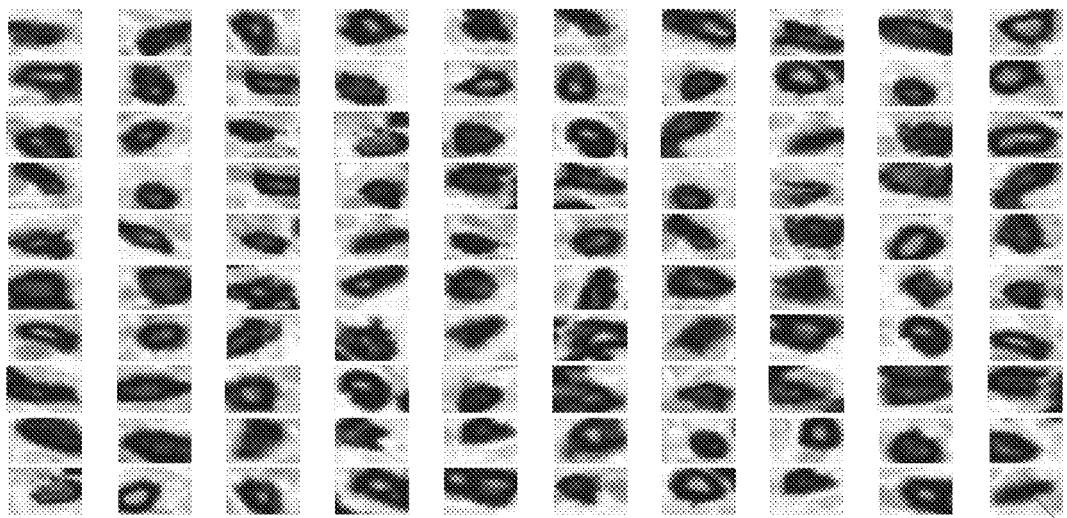
Figure 3E:
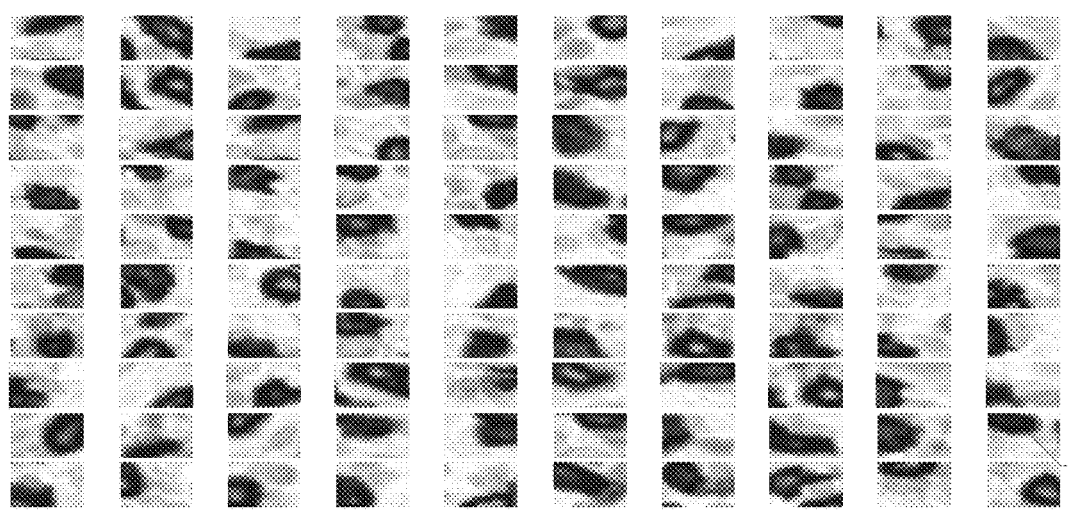
Figure 3F:
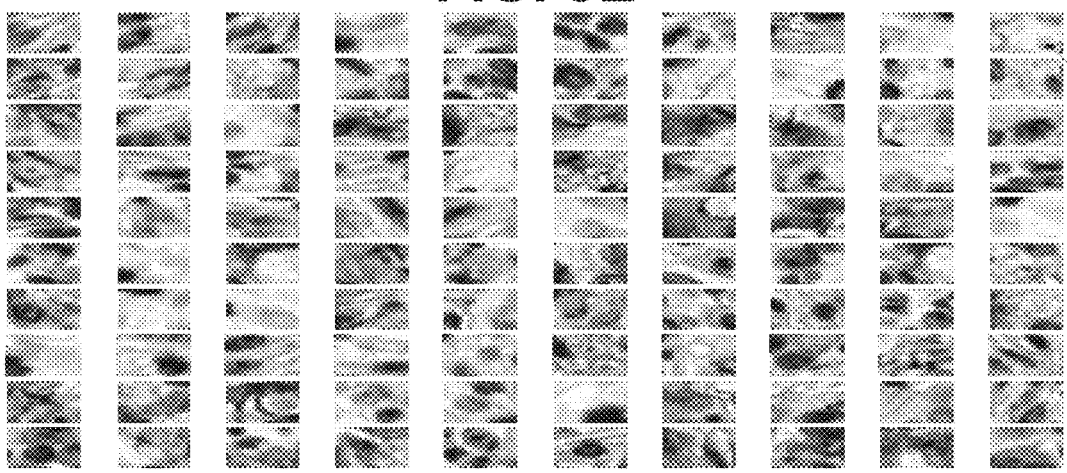

FIGS. 3D-3F show the examples of three different types of patches that are utilized for training the classifier in the single channel input scenario, according to exemplary embodiments of the subject disclosure. The center of each patch identifies the structure, whether it is a center or centroid of a nucleus, a membrane, background pixel or group of pixels, etc. Although centroids, membranes, and backgrounds are shown, other labels beyond these may be possible, including specifying t-cell membranes, b-cell membranes, t-cell nucleus, b-cell nucleus, etc. FIG. 3D shows patches for immune cells 334, FIG. 3E shows patches for cell membranes 335, i.e., illustrating the boundary between the cell and the background, and FIG. 3F shows patches for backgrounds 336. Using these patches, a positive class (i.e. one that positively identifies an immune cell 334) may include patches from FIG. 3D, and a negative class (i.e. one that depicts no T-cells of interest) contains patches from FIGS. 3E and 3F.

Testing/Applying Neural Network

Figure 4A:
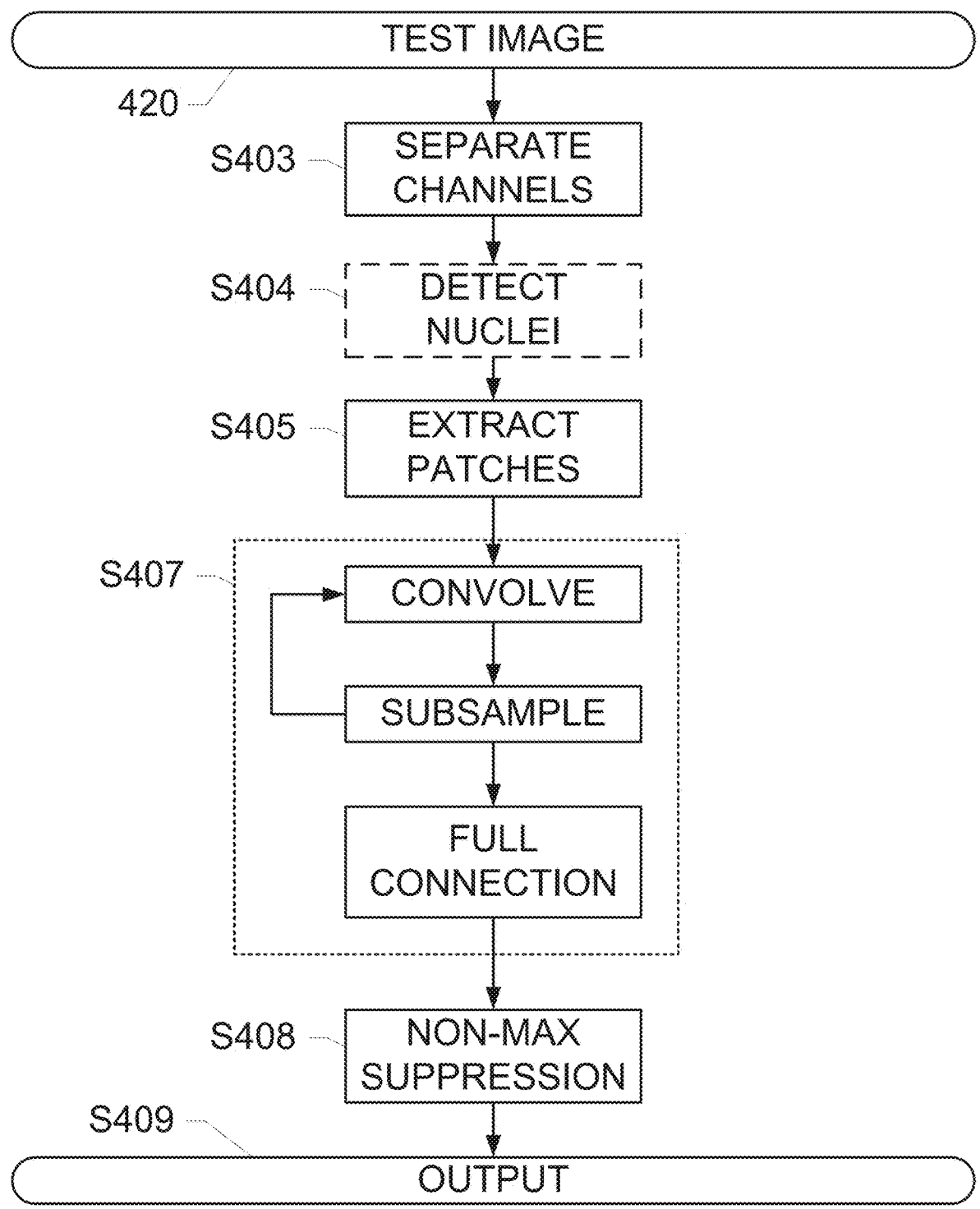
FIGS. 4A-4C show a method for automatic cell detection, according to an exemplary embodiment of the subject disclosure.
Figure 4B:
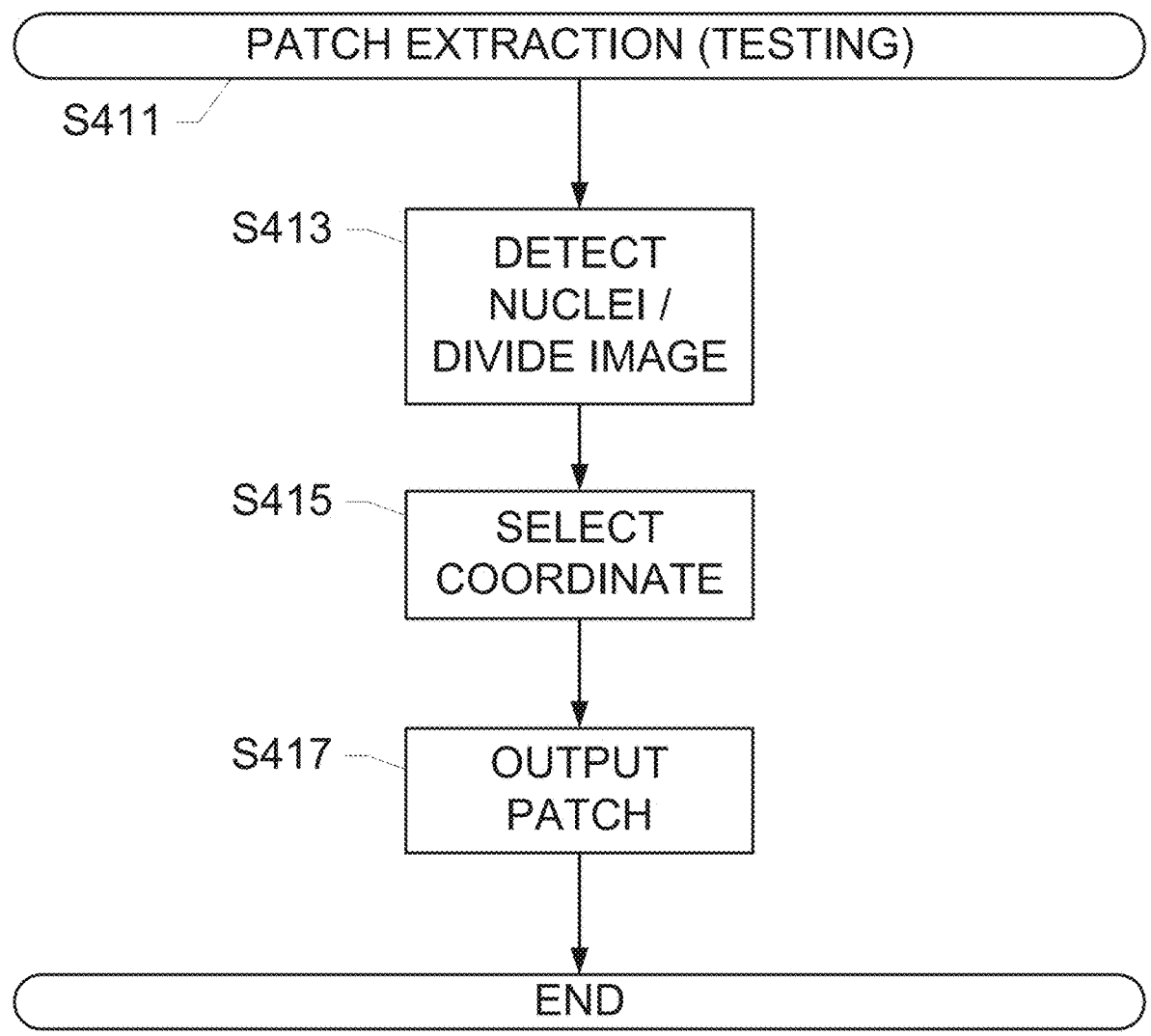
Figure 4C:
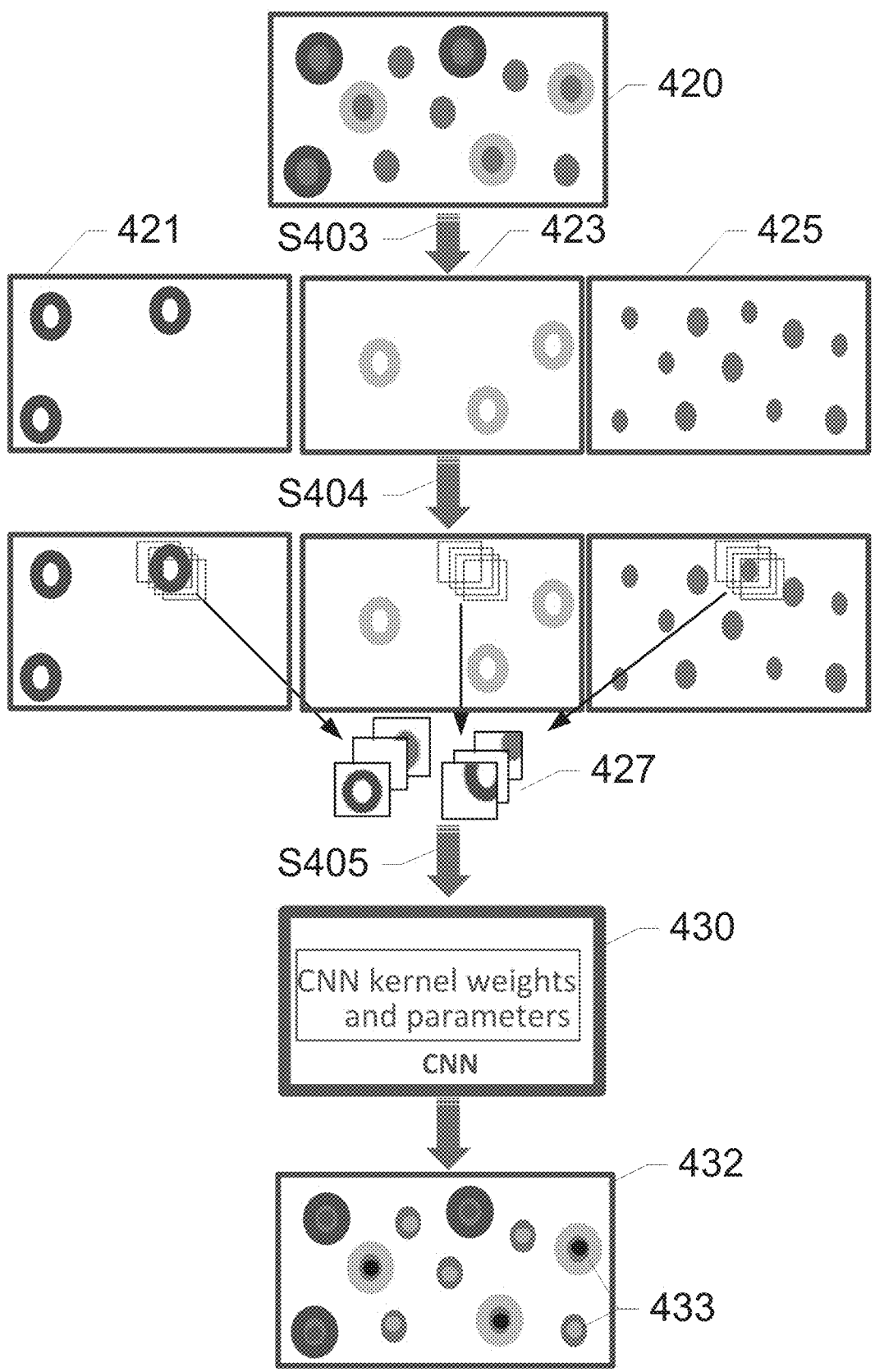

FIGS. 4A-4C respectively show methods for and examples of automatic cell detection, according to an exemplary embodiment of the subject disclosure. As described herein, a convolutional neural network (CNN) module is trained with the training data. The CNN module is basically a neural network with the sequence of alternating convolutional layers and sub-sampling layers, followed by the fully connected layers, which can be trained by back-propagation algorithm. With reference to FIG. 4A, the method begins with an input of a test image (S401). The channels within the test image are separated (S403) or unmixed, with each channel representing or depicting a particular structure of interest, such as an immune cell or nucleus. A single channel may depict more than one structure; however, the channels are separated such that a target structure or structure of interest may be clearly identified. Multiple channels can be processed simultaneously. The multi-channel image may be the RGB image, LAB image, or multiple unmixed channels. A plurality of patches may be extracted (S405) from the plurality of channels. In some embodiments, patch extraction step (S405) extracts image patches around candidate locations that are determined by radial symmetry or ring detection operations for nuclei detection (S404) that are applied to the image to determine candidate locations for cells or structures of interest.

Details on patch extraction are further depicted with respect to FIG. 4B, which depicts a method for patch extraction during testing. In step S413, either nuclei or other structures in the image are detected using segmentation or other operations, and coordinates of the detected structures selected in step S415. Alternatively, in step S413, the image is divided into a plurality of portions, with patches for each portion or pixel being selected and extracted. For instance, a N×N×D patch around each pixel or every k pixels in the image may be extracted, with N×N being a size of the image patch in pixels or any other unit of size, and D being the number of channels in the image.

Figure 5:
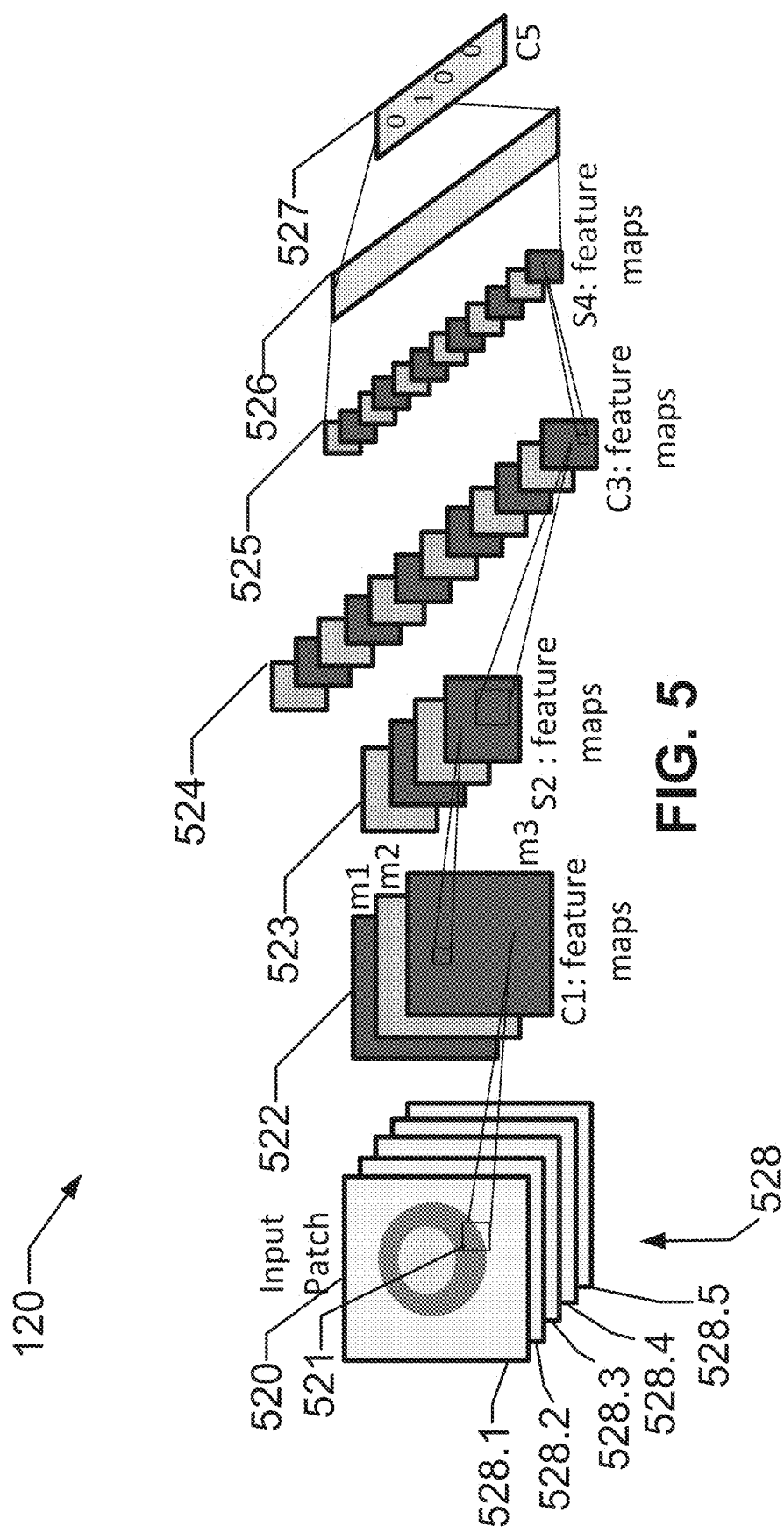
FIG. 5 shows a convolutional neural network algorithm, according to an exemplary embodiment of the subject disclosure.

In either case, the output plurality of patches is used as an input into the CNN module (S407) for classifying the patches into classes of different cell types or backgrounds. The CNN module (S407) includes convolving each input patch with a kernel matrix, and outputting the results to a continuous and differentiable activation function that is further described with respect to FIG. 5. The kernel matrix is part of the plurality of parameters that are learned by CNN operation (S407) during the training procedure described in FIGS. 2A-2B. The sub-sampling layer reduces the size of the image by a coarse sampling or max-pooling as shown in FIG. 5, elements 523 and 525, which reduces the size of the image by half. Each desired or target feature is mapped to a feature map, with multiple features being able to be mapped to a single map, a.k.a. a fully connected layer, as further described with reference to FIGS. 5 and 6. The convolving and subsampling processes (S407) are repeated on each image patch until a pre-determined number of layers is reached, with the pre-determined number being determined during the training of the CNN as provided by a user. Generally the number of layers is selected such that whatever desired target structures are mapped.

Once the structures are mapped, the maps are fully connected, and the CNN operation (S407) outputs a map comprising a fully connected layer that is similar to the typical neural network to generate probabilistic labels for each class. The probability map generated represents a presence of each different type of immune cell or other target structure within the input patches. In some embodiments, the cell centroids may be obtained by determining immune cell coordinates using a non-maximum suppression operation (S408), which is a known edge thinning technique that can help to suppress all the gradient values to 0 except the local maxima, which indicates the location with the sharpest change of intensity value.

With reference to FIG. 4C, the test image 420 is separated (S403) into a plurality of channels within the test image, with each channel representing or depicting a particular structure of interest, such as an immune cell or nucleus. For example, the channels extracted may include a first type of immune cell marker channel 421, a second type of immune cell marker channel 423, and a nucleus marker channel 425. In some embodiments, the channels can be other type of image channels such as RGB channels, LAB channels, or channels from multi-spectral imaging system. A plurality of patches 427 may be extracted (S404) from each channel. Each patch 427 may be classified using the labels from a label database. In some embodiments, patch extraction includes extracting image patches around candidate locations of structures, for example cells, which are determined by radial symmetry or ring detection operations that are applied to the image to determine candidate locations for cells or structures of interest. Such patch extracted may be more efficient than scanning all the pixels of the image, however, any combination of structure detection and patch extraction may be used that properly enables classification of patches.

The patches are input (S405) into the CNN module 430. During the CNN operation, a convolutional layer convolves each input patch with a kernel matrix and the output of which will be passed to a continuous and differentiable activation function. The kernel matrix is part of the plurality of parameters that are learned by CNN operation in the training phases described in FIGS. 2A-2B and other sections herein. A probability map is generated as the output of CNN. The probability map represents a presence of each different type of immune cell or other target structure within the input patches. Further, to identify the location of the target image structure or component, for example cell, the centroid or center of the cell may be obtained by determining the centroid coordinates using a non-maximum suppression operation. By utilizing the non-maximum suppression operation, the local maximum in that region wherein that pixel has higher values than everything around it in that neighborhood is found, and therefore corresponds to the center or centroid of the identified structure, for example, the nucleus. The final detection of the cells is shown in 432, with indicators 433 depicting locations of the centroids.

Convolutional Neural Network

The convolutional neural network (CNN) uses parameters for how many convolutional layers, sampling layers, connection layers are used to process the image patches, and defines parameters for each layer, as described herein and as described in Gradient-Based Learning Applied to Document Recognition, Yann LeCun et. al., Proc. Of the IEEE, November 1998, pp. 1-46, (http://yann.lecun.com/exdb/publis/pdf/lecun-98.pdf) and http://deeplearning.net/tutorial/lenet.html which are both incorporated herein by reference. In particular, an architecture that is analogous to LeNet-5 may be utilized for the CNN module 120 (cf. FIG. 1).

The convolutional layer convolves the input patch with a kernel matrix, the output of which will be passed to a continuous and differentiable activation function. Convolving means summing the local intensity value for every local region. The result of the summation is assigned to the center. The kernel matrix is part of the plurality of parameters that are learned by the CNN. The sub-sampling layer reduces the size of the image by a coarse sampling or max-pooling. The fully connected layer is similar to the typical neural network to generate probabilistic labels for each class.

As depicted in FIG. 5, a plurality of patches 521 can be used as an input into the CNN. A first convolution layer 522 convolves or extracts features from the patch image 520 from the previous layer with a kernel matrix $W^k$ using the following equation:

$$h^k = \tanh((W^{k*}x) + b_k)$$

using the notation from http://deeplearning.net/tutorial/lenet.html

Where x represents the patch, $b_k$ is the bias. $W^k$ and $b_k$ are parameters acquired from training. This includes taking the mean value of the intensities of the 3×3 neighborhood (i.e. patch) of that pixel, and assigning that mean value to the pixel. K represents the number of iterations. A single unit 521 is convolved at one time, and a plurality of single units 521 may be convolved. Subsequently, subsampling layers 523 and 525 subsample the patch image from the previous layer to a smaller size, for example, half of its size, i.e. respectively from convolution layers 522 and 524. A max-pooling operation may also be used for non-linear down sampling. These sub-sampling and/or max pooling operations reduce the size of each image so as to minimize any translational errors, making the model more robust. For example, the translational error may be a few pixels difference between the detected center and the real center.

Figures 6A, 6B:
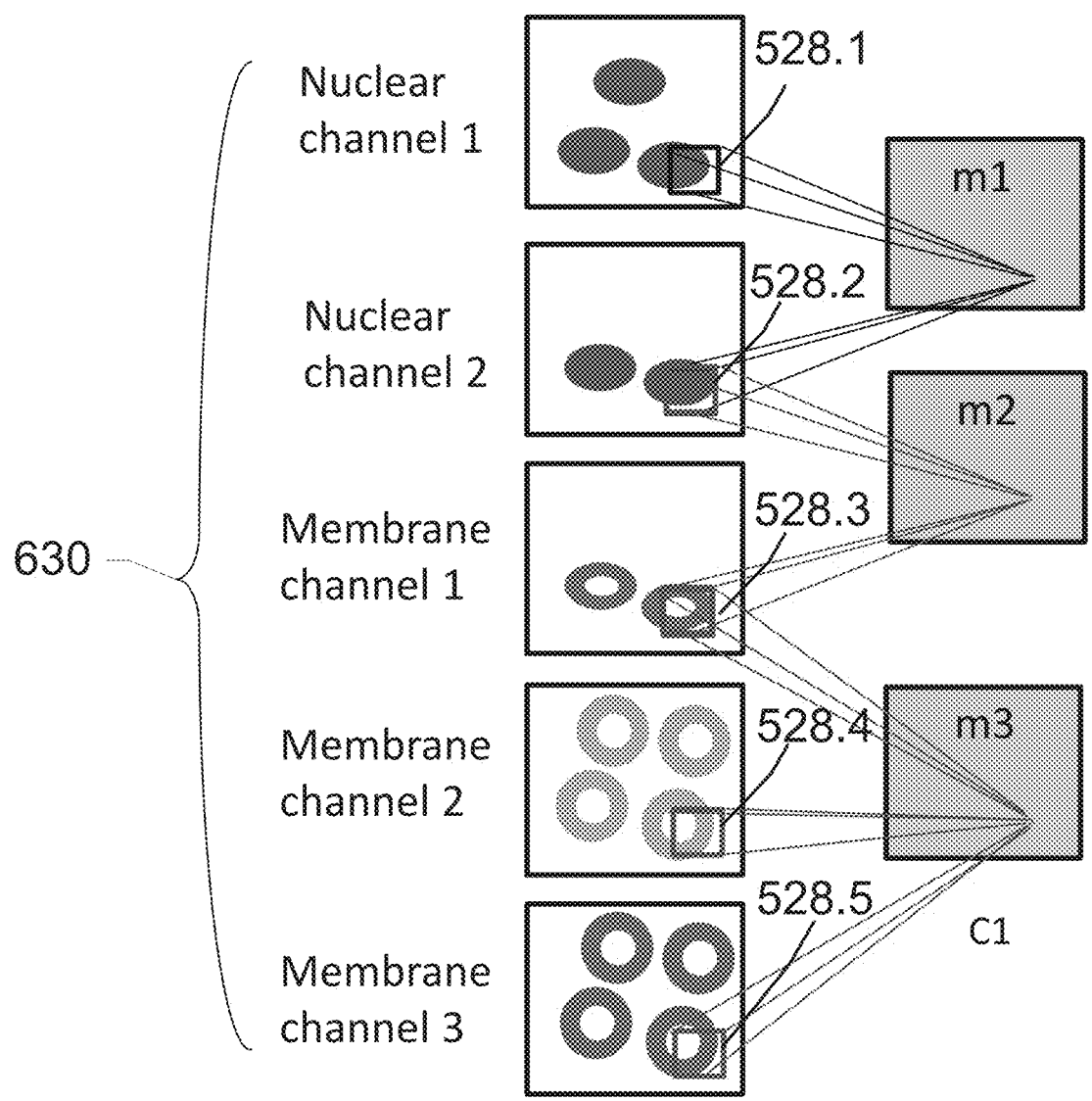
FIGS. 6A-6B show a modified CNN algorithm, according to an exemplary embodiment of the subject disclosure.

In accordance with embodiments of the invention a multi-channel image is acquired by means of an image sensor and the multi-channel image is unmixed which provides one unmixed image per channel. In the example considered with respect to FIGS. 5 and 6 the number of channels is five, namely nuclear channel 1, nuclear channel 2, membrane channel 1, membrane channel 2 and membrane channel 3 as depicted in FIG. 6a. Candidate locations for the biological structures that are represented by these channels are detected by applying an image processing algorithm, such as by radial symmetry detection or ring detection. As a consequence a number of candidate locations for the biological structures of interest is identified in the unmixed images.

For each of the candidate locations a stack of image patches is extracted from the unmixed images, such as the stack 528 that comprises five image patches 528.1 to 528.5, where each of the image patches of the stack 528 comprises the same candidate location on the original multi-channel image. As a consequence a stack of image patches of the type of stack 528 is obtained for each one of the candidate locations that have been detected by applying the image processing algorithm. These stacks of image patches are sequentially entered into the CNN that is provided by the module 120 (cf. FIG. 1).

The first one C1 of the convolutional layers of the CNN is coupled to the inputs of the CNN as depicted in FIG. 6a by connection mapping of the inputs to the feature maps m1, m2, m3 wherein the mapping is performed in accordance with co-location data being descriptive of groups of the stains. The inputs for channels that represent the same group of stains are mapped onto a common feature map.

The co-location data may be stored as co-location data 122 (cf. FIG. 1). The co-location data 122 describes groups of stains that can be co-located. The co-location data 122 is used for configuring the CNN such that inputs of the CNN that belong to the same group are mapped onto a common feature map. For example the inputs of the CNN for image patches 528.1 and 528.2, hence nuclear channel 1 and nuclear channel 2, are mapped onto the same feature map m1 whereas the inputs for nuclear channel 2 and membrane channel 1 are mapped onto m2 in accordance with the co-location data 122 in the example considered here.

The CNN outputs a probability map that represents a probability for the presence of the biological features in the acquired multi-channel image. For example, the image coordinates of the stack 528 are used to map the probability that is output by the CNN back onto the original multi-channel image in order to display a respective label indicating the probability. At least one probability value is obtained for each one of the stacks that is sequentially entered into the CNN.

It is to be noted that the output of the CNN may provide the probability of a classifier that is descriptive of the presence of a combination of the biological features. Hence, depending on the embodiment, a single probability for a classifier or a number of probabilities that is equal or below the number of channels may be provided at the output of the CNN in response to entry of the stack 528.

The training of the CNN may be performed analogously by sequentially entering stacks of the type of stack 528 obtained from training images together with the respective labeling information.

The convolution and subsampling operations are repeated until a full connection layer is derived. The full connection layer is the neural network that represents the features in the image patch. This output is in the form of a soft label vector comprising real numbers for each patch. For example, an output of [0.95, 0.05] for a two-class problem indicates a high probability 0.95 of the structure being a T-cell. The output is a L-dimensional vector for a L-class problem, and therefore may comprise a plurality of real numbers depending on the number of input patches, and each set of real numbers indicates.

A possible extension to this algorithm is to parallel process the pixel-based classification, especially during the testing phase. This makes the detection more efficient. Further, color unmixing may be applied to obtain a specific color channel, and classification may be performed only for pixels that match a mask of the specific color, e.g. brown. This greatly reduces the number of pixels to be processed, and accelerates the algorithm. Additional possible generalizations of the CNN algorithm may include replacing the 2D convolution kernel depicted in FIG. 5 with a 3D kernel for a three-channel input image. For example, a N-channel input image with more than 3 colors may be processed by first applying color unmixing to get N different channels associated with different markers, and then parallel-processing each channel.

FIGS. 6A-6B show a modified CNN algorithm that combines color deconvolution or unmixing with for example, neural networking, according to an exemplary embodiment of the subject disclosure. For example, a trained operator or pathologist may have provided biologically relevant connections during training, by identifying which groupings are possible between matching structures in different channels separated from the training images. For example, if 3 channels correspond to a specific T-cell then they are put together. FIG. 6A depicts a plurality of different marker channels 630 in an unmixed image used to build a connection map. A connection map can be built based on the marker information input by the pathologist, so that the corresponding markers can be grouped together for the implicit feature extraction. As shown in FIG. 6A, one may obtain 5 channels 630 from unmixing. The nuclear marker channels 1 and 2 are mapped to the same feature map m1, and the membrane marker channels 1, 2, and 3, are also in one group m3. An additional group contains nuclear channel 2 and membrane channel 1, and may model the co-existence information of the two markers. With this design, the CNN can detect the cells with different marker combinations simultaneously.

FIG. 6B shows a creation of a feature map m1 created from channel NC1 and NC2 and feature map m2 created from channels NC2 and MC1, etc, where m indicates map, MC indicates membrane channel, and NC indicates nuclear channel. By doing this, the same 2D convolution kernels can be applied to a marker specified multi-channel image. In other words, the biological information is added to configure the CNN, with the connection mapping values 1 in FIG. 6B being representative of the biological information. The convolution operation to the image patch will be applied only when the value in the connection map equals to 1. The operator/pathologist is allowed to set up the connection mapping to incorporate prior knowledge of the biological information. With such a modification of the CNN, the trained CNN algorithm contains the biological information of the markers and combinations provided by the trainer operator/pathologist, resulting in better detection. Moreover, instead of having a full connection between the layers, the connection map reduces the number of connections which is equivalent to reducing the number of parameters in the network. The smaller number of parameters leads to faster training of the algorithm.

Figure 7:
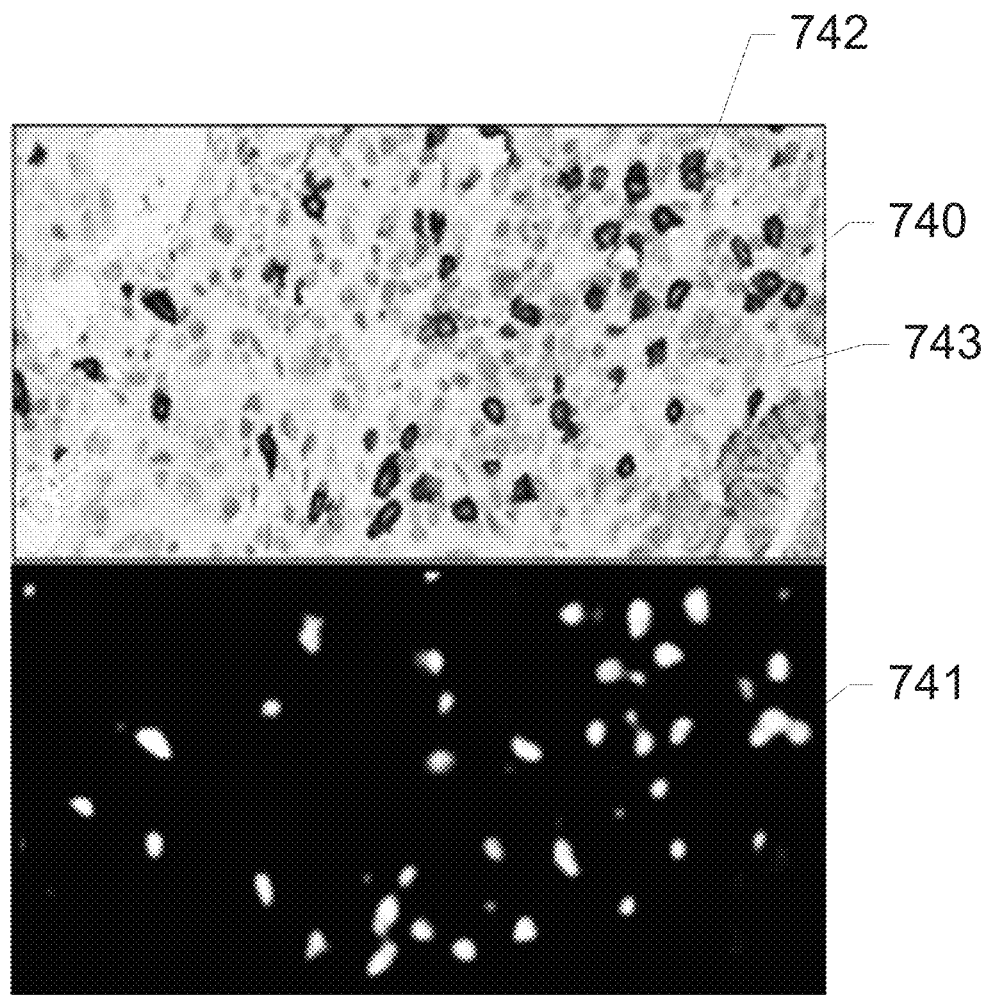
FIG. 7 shows the output label map for a test image, according to an exemplary embodiment of the subject disclosure.

FIG. 7 shows the output label probability map 741 for a test image 740, according to an exemplary embodiment of the subject disclosure. Label map 741 depicts cells 742 from test image 740 identified against a black background corresponding to the background 743 of test image 740.

Figure 8:
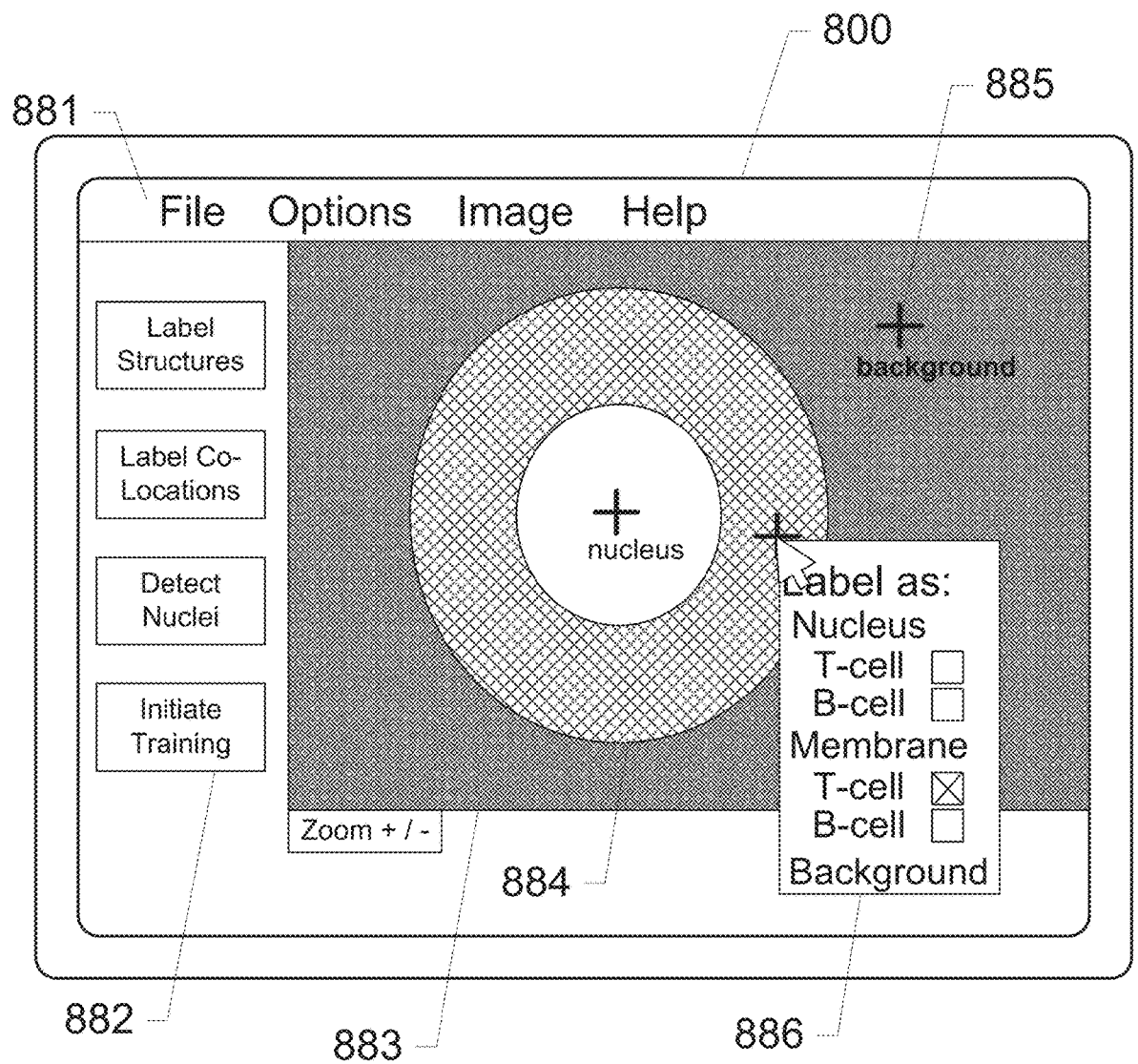
FIG. 8 depicts a user interface for training a neural network, according to an exemplary embodiment of the subject disclosure.

FIG. 8 depicts a user interface 800 for training a neural network, according to an exemplary embodiment of the subject disclosure. The user interface 800 depicts a menu bar 881, options 882 for labeling structures or co-locations, detecting nuclei, initiating training, etc., and a viewing pane 883 for viewing an image of a cell 884. As shown herein, a trained operator such as a pathologist may identify and label features or structures of the image, such as background locator 885. The image depicts the process of labeling a t-cell membrane, using a context menu 886. For instance, the pathologist may determine the presence of a t-cell membrane, and use a cursor such as a mouse pointer to select the membrane, to add a locator, and to load context menu 886 with a click, so as to select which type of label to use for the locator. Subsequently, the pathologist may initiate training 882 after having selected the structures that are expected to be detected in test images. The user interface can also allow the user to select the number of convolutional layer and subsampling layers, and configure the connection maps. For example, the user can type in a desired number of layers in a pop up window after clicking the initiate training button 882. This user interface is merely exemplary, and other features and options, whether described herein or apparent to one having ordinary skill in the art in light of this disclosure, may be added to actual user interfaces depending on the implementation.

The CNN classification, patch extraction, and other operations disclosed herein may be ported into a hardware graphics processing unit (GPU), enabling a multi-threaded parallel implementation. Moreover, besides medical applications such as anatomical or clinical pathology, prostate/lung cancer diagnosis, etc., the same methods may be performed to analysis other types of samples such as remote sensing of geologic or astronomical data, etc.

Computers typically include known components, such as a processor, an operating system, system memory, memory storage devices, input-output controllers, input-output devices, and display devices. It will also be understood by those of ordinary skill in the relevant art that there are many possible configurations and components of a computer and may also include cache memory, a data backup unit, and many other devices. Examples of input devices include a keyboard, cursor control devices (e.g., a mouse), a microphone, a scanner, and so forth. Examples of output devices include a display device (e.g., a monitor or projector), speakers, a printer, a network card, and so forth. Display devices may include display devices that provide visual information, this information typically may be logically and/or physically organized as an array of pixels. An interface controller may also be included that may comprise any of a variety of known or future software programs for providing input and output interfaces. For example, interfaces may include what are generally referred to as "Graphical User Interfaces" (often referred to as GUI's) that provide one or more graphical representations to a user. Interfaces are typically enabled to accept user inputs using means of selection or input known to those of ordinary skill in the related art. The interface may also be a touch screen device. In the same or alternative embodiments, applications on a computer may employ an interface that includes what are referred to as "command line interfaces" (often referred to as CLI's). CLI's typically provide a text based interaction between an application and a user. Typically, command line interfaces present output and receive input as lines of text through display devices. For example, some implementations may include what are referred to as a "shell" such as Unix Shells known to those of ordinary skill in the related art, or Microsoft Windows Powershell that employs object-oriented type programming architectures such as the Microsoft .NET framework.

Those of ordinary skill in the related art will appreciate that interfaces may include one or more GUI's, CLI's or a combination thereof. A processor may include a commercially available processor such as a Celeron, Core, or Pentium processor made by Intel Corporation, a SPARC processor made by Sun Microsystems, an Athlon, Sempron, Phenom, or Opteron processor made by AMD Corporation, or it may be one of other processors that are or will become available. Some embodiments of a processor may include what is referred to as multi-core processor and/or be enabled to employ parallel processing technology in a single or multi-core configuration. For example, a multi-core architecture typically comprises two or more processor "execution cores". In the present example, each execution core may perform as an independent processor that enables parallel execution of multiple threads. In addition, those of ordinary skill in the related will appreciate that a processor may be configured in what is generally referred to as 32 or 64 bit architectures, or other architectural configurations now known or that may be developed in the future.

A processor typically executes an operating system, which may be, for example, a Windows type operating system from the Microsoft Corporation; the Mac OS X operating system from Apple Computer Corp.; a Unix or Linux-type operating system available from many vendors or what is referred to as an open source; another or a future operating system; or some combination thereof. An operating system interfaces with firmware and hardware in a well-known manner, and facilitates the processor in coordinating and executing the functions of various computer programs that may be written in a variety of programming languages. An operating system, typically in cooperation with a processor, coordinates and executes functions of the other components of a computer. An operating system also provides scheduling, input-output control, file and data management, memory management, and communication control and related services, all in accordance with known techniques.

System memory may include any of a variety of known or future memory storage devices that can be used to store the desired information and that can be accessed by a computer. Computer readable storage media may include volatile and non-volatile, removable and non-removable media implemented in any method or technology for storage of information such as computer readable instructions, data structures, program modules, or other data. Examples include any commonly available random access memory (RAM), read-only memory (ROM), electronically erasable programmable read-only memory (EEPROM), digital versatile disks (DVD), magnetic medium, such as a resident hard disk or tape, an optical medium such as a read and write compact disc, or other memory storage device. Memory storage devices may include any of a variety of known or future devices, including a compact disk drive, a tape drive, a removable hard disk drive, USB or flash drive, or a diskette drive. Such types of memory storage devices typically read from, and/or write to, a program storage medium such as, respectively, a compact disk, magnetic tape, removable hard disk, USB or flash drive, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with memory storage device. In some embodiments, a computer program product is described comprising a computer usable medium having control logic (computer software program, including program code) stored therein. The control logic, when executed by a processor, causes the processor to perform functions described herein. In other embodiments, some functions are implemented primarily in hardware using, for example, a hardware state machine. Implementation of the hardware state machine so as to perform the functions described herein will be apparent to those skilled in the relevant arts. Input-output controllers could include any of a variety of known devices for accepting and processing information from a user, whether a human or a machine, whether local or remote. Such devices include, for example, modem cards, wireless cards, network interface cards, sound cards, or other types of controllers for any of a variety of known input devices. Output controllers could include controllers for any of a variety of known display devices for presenting information to a user, whether a human or a machine, whether local or remote. In the presently described embodiment, the functional elements of a computer communicate with each other via a system bus. Some embodiments of a computer may communicate with some functional elements using network or other types of remote communications. As will be evident to those skilled in the relevant art, an instrument control and/or a data processing application, if implemented in software, may be loaded into and executed from system memory and/or a memory storage device. All or portions of the instrument control and/or data processing applications may also reside in a read-only memory or similar device of the memory storage device, such devices not requiring that the instrument control and/or data processing applications first be loaded through input-output controllers. It will be understood by those skilled in the relevant art that the instrument control and/or data processing applications, or portions of it, may be loaded by a processor, in a known manner into system memory, or cache memory, or both, as advantageous for execution. Also, a computer may include one or more library files, experiment data files, and an internet client stored in system memory. For example, experiment data could include data related to one or more experiments or assays, such as detected signal values, or other values associated with one or more sequencing by synthesis (SBS) experiments or processes. Additionally, an internet client may include an application enabled to access a remote service on another computer using a network and may for instance comprise what are generally referred to as "Web Browsers". In the present example, some commonly employed web browsers include Microsoft Internet Explorer available from Microsoft Corporation, Mozilla Firefox from the Mozilla Corporation, Safari from Apple Computer Corp., Google Chrome from the Google Corporation, or other type of web browser currently known in the art or to be developed in the future. Also, in the same or other embodiments an internet client may include, or could be an element of, specialized software applications enabled to access remote information via a network such as a data processing application for biological applications.

A network may include one or more of the many various types of networks well known to those of ordinary skill in the art. For example, a network may include a local or wide area network that may employ what is commonly referred to as a TCP/IP protocol suite to communicate. A network may include a network comprising a worldwide system of interconnected computer networks that is commonly referred to as the internet, or could also include various intranet architectures. Those of ordinary skill in the related arts will also appreciate that some users in networked environments may prefer to employ what are generally referred to as "firewalls" (also sometimes referred to as Packet Filters, or Border Protection Devices) to control information traffic to and from hardware and/or software systems. For example, firewalls may comprise hardware or software elements or some combination thereof and are typically designed to enforce security policies put in place by users, such as for instance network administrators, etc.

The foregoing disclosure of the exemplary embodiments of the present subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents.

Further, in describing representative embodiments of the present subject disclosure, the specification may have presented the method and/or process of the present subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present subject disclosure should not be limited to the performance of their steps in the order written, and one skilled in the art can readily appreciate that the sequences may be varied and still remain within the spirit and scope of the present subject disclosure.

What is claimed is:

1. A computer-implemented method comprising:
    extracting a patch extracted from a test image, the patch being generated around a candidate location of a detected structure in the test image, wherein the candidate location is determined by one or more of radial detection, ring detection, or foreground thresholding;
    convolving and subsampling regions of the patch to generate a plurality of connections, until a fully connected layer is derived; and
    generating at least one probability map of one or more cellular structures within the test image based on the fully connected layer,
    wherein a color unmixing operation is applied to obtain a specific color channel of the test image, and the plurality of connections of the convolving and subsampling operations are configured based on potential biological information of the detected structure within the specific color channel of the test image.

2. The computer-implemented method of claim 1, further comprising applying a local maximum finding method to the probability map of at least a portion of the test image to identify a particular pixel of the at least a portion of the test image that will be used as the location of the detected structure.

3. The computer-implemented method of claim 1, further comprising training a convolutional neural network to obtain a probable location of the one or more cellular structures.

4. The computer-implemented method of claim 3, further comprising separating the image into color channels corresponding to the one or more cellular structures in the image.

5. The computer-implemented method of claim 4, wherein the color channels include at least a cellular structure channel and a background image structure channel.

6. A system comprising:
    one or more data processors; and
    a non-transitory computer readable storage medium containing instructions which, when executed on the one or more data processors, cause the one or more data processors to perform actions including:
        extracting a patch extracted from a test image, the patch being generated around a candidate location of a detected structure in the test image, wherein the candidate location is determined by one or more of radial detection, ring detection, or foreground thresholding;
        convolving and subsampling regions of the patch to generate a plurality of connections, until a fully connected layer is derived; and
        generating at least one probability map of one or more cellular structures within the test image based on the fully connected layer,
        wherein a color unmixing operation is applied to obtain a specific color channel of the test image, and the plurality of connections of the convolving and subsampling operations are configured based on a potential biological information of the detected structure within the specific color channel of the test image.

7. The system of claim 6, wherein the actions further comprise applying a local maximum finding method to the probability map of at least a portion of the test image to identify a particular pixel of the at least a portion of the test image that will be used as the location of the detected structure.

8. The system of claim 6, wherein the actions further comprise training a convolutional neural network to obtain a probable location of the one or more cellular structures.

9. The system of claim 8, wherein the actions further comprise separating the image into color channels corresponding to the one or more cellular structures in the image.

10. The system of claim 9, wherein the color channels include at least a cellular structure channel and a background image structure channel.

11. A computer-program product tangibly embodied in a non-transitory machine-readable storage medium, including instructions configured to cause one or more data processors to perform actions including:
   extracting a patch extracted from a test image, the patch being generated around a candidate location of a detected structure in the test image, wherein the candidate location is determined by one or more of radial detection, ring detection, or foreground thresholding;
   convolving and sub sampling regions of the patch to generate a plurality of connections, until a fully connected layer is derived; and
   generating at least one probability map of one or more cellular structures within the test image based on the fully connected layer,
   wherein a color unmixing operation is applied to obtain a specific color channel of the test image, and the plurality of connections of the convolving and subsampling operations are configured based on a potential biological information of the detected structure within the specific color channel of the test image.

12. The computer-program product of claim 11, wherein the actions further comprise applying a local maximum finding method to the probability map of at least a portion of the test image to identify a particular pixel of the at least a portion of the test image that will be used as the location of the detected structure.

13. The computer-program product of claim 11, wherein the actions further comprise training a convolutional neural network to obtain a probable location of the one or more cellular structures.

14. The computer-program product of claim 13, wherein the actions further comprise separating the image into color channels corresponding to the one or more cellular structures in the image.

15. The computer-program product of claim 14, wherein the color channels include at least a cellular structure channel and a background image structure channel.

* * * * *